(12) United States Patent
Kim et al.

(10) Patent No.: US 12,100,370 B1
(45) Date of Patent: Sep. 24, 2024

(54) DISPLAY APPARATUS AND POWER SUPPLY THEREOF

(71) Applicant: SAMSUNG ELECTRONICS CO., LTD., Suwon-si (KR)

(72) Inventors: Jaeeun Kim, Suwon-si (KR); Keonwoo Kim, Suwon-si (KR); Moonyoung Kim, Suwon-si (KR); Jinhyung Lee, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/120,791

(22) Filed: Mar. 13, 2023

Related U.S. Application Data

(63) Continuation of application No. PCT/KR2023/001631, filed on Feb. 6, 2023.

(30) Foreign Application Priority Data

May 23, 2022 (KR) .................. 10-2022-0063088
Jul. 18, 2022 (KR) .................. 10-2022-0088540

(51) Int. Cl.
*G09G 5/10* (2006.01)

(52) U.S. Cl.
CPC ....... *G09G 5/10* (2013.01); *G09G 2320/0626* (2013.01); *G09G 2330/021* (2013.01); *G09G 2330/027* (2013.01)

(58) Field of Classification Search
None
See application file for complete search history.

(56) References Cited

U.S. PATENT DOCUMENTS

| | | | |
|---|---|---|---|
| 4,680,688 A | 7/1987 | Inou et al. | |
| 5,093,654 A * | 3/1992 | Swift | G09G 3/30 345/212 |

(Continued)

FOREIGN PATENT DOCUMENTS

| | | |
|---|---|---|
| JP | 2017-183412 A | 10/2017 |
| KR | 10-2005-0041146 A | 5/2005 |

(Continued)

OTHER PUBLICATIONS

Transformer Basics, downloaded from https://ecstudiosystems.com/discover/textbooks/basic-electronics/transformers/transformer-basics/, pp. 1-15, 2021 (Year: 2021).*

(Continued)

*Primary Examiner* — Dorothy Harris
(74) *Attorney, Agent, or Firm* — Sughrue Mion, PLLC

(57) ABSTRACT

A display apparatus includes: a display, a processor configured to process image data to be displayed on the display, a transformer including a primary coil and a plurality of secondary coils, a first rectifier connected with a first coil of the plurality of secondary coils and configured to output a first output voltage corresponding to a number of turns of the first coil, a direct current-direct current (DC-DC) converter configured to receive the first output voltage from the first rectifier and output a second output voltage that is different from the first output voltage, and a second rectifier connected with a second coil of the plurality of secondary coils and configured to output a first load voltage which is a sum of the second output voltage and a third output voltage corresponding to a number of turns of the second coil to the display.

24 Claims, 14 Drawing Sheets

(56) References Cited

U.S. PATENT DOCUMENTS

| | | | |
|---|---|---|---|
| 5,479,087 A * | 12/1995 | Wright | H02M 3/33561 |
| | | | 363/21.08 |
| 7,319,600 B2 | 1/2008 | Lee et al. | |
| 7,518,263 B2 | 4/2009 | Gan et al. | |
| 7,915,757 B2 | 3/2011 | Kim et al. | |
| 8,223,520 B2 | 7/2012 | Aso et al. | |
| 8,395,915 B2 | 3/2013 | Hong et al. | |
| 9,350,257 B2 | 5/2016 | Koo et al. | |
| 9,917,520 B2 | 3/2018 | Wu | |
| 11,088,571 B2 * | 8/2021 | Choi | G09G 3/2096 |
| 2003/0076314 A1 * | 4/2003 | Kang | H04N 3/185 |
| | | | 345/211 |
| 2004/0165119 A1 * | 8/2004 | Choi | H04N 5/44 |
| | | | 348/730 |
| 2004/0257838 A1 | 12/2004 | Gan et al. | |
| 2007/0176565 A1 * | 8/2007 | Nomizo | H05B 41/2882 |
| | | | 315/247 |
| 2008/0061701 A1 * | 3/2008 | Lee | H05B 41/282 |
| | | | 315/9 |
| 2012/0005493 A1 * | 1/2012 | Fujita | H04N 5/63 |
| | | | 713/300 |
| 2013/0020989 A1 * | 1/2013 | Xia | H02M 7/2176 |
| | | | 320/109 |
| 2013/0285565 A1 | 10/2013 | Feng et al. | |
| 2014/0139021 A1 | 5/2014 | Han et al. | |
| 2022/0115950 A1 * | 4/2022 | Hallikainen | H02M 3/1588 |

FOREIGN PATENT DOCUMENTS

| | | |
|---|---|---|
| KR | 10-0811738 B1 | 3/2008 |
| KR | 10-0872467 B1 | 12/2008 |
| KR | 10-2009-0055952 A | 6/2009 |
| KR | 10-2009-0079873 A | 7/2009 |
| KR | 10-1731111 B1 | 4/2017 |
| KR | 10-1759619 B1 | 7/2017 |
| KR | 10-2017-0118221 A | 10/2017 |
| KR | 10-2019-0011024 A | 2/2019 |
| KR | 10-2136564 B1 | 7/2020 |

OTHER PUBLICATIONS

International Search Report (PCT/ISA/210) issued May 23, 2023 by the International Searching Authority in International Application No. PCT/KR2023/001631.

Written Opinion (PCT/ISA/237) issued May 23, 2023 by the International Searching Authority in International Application No. PCT/KR2023/001631.

* cited by examiner

FIG. 7
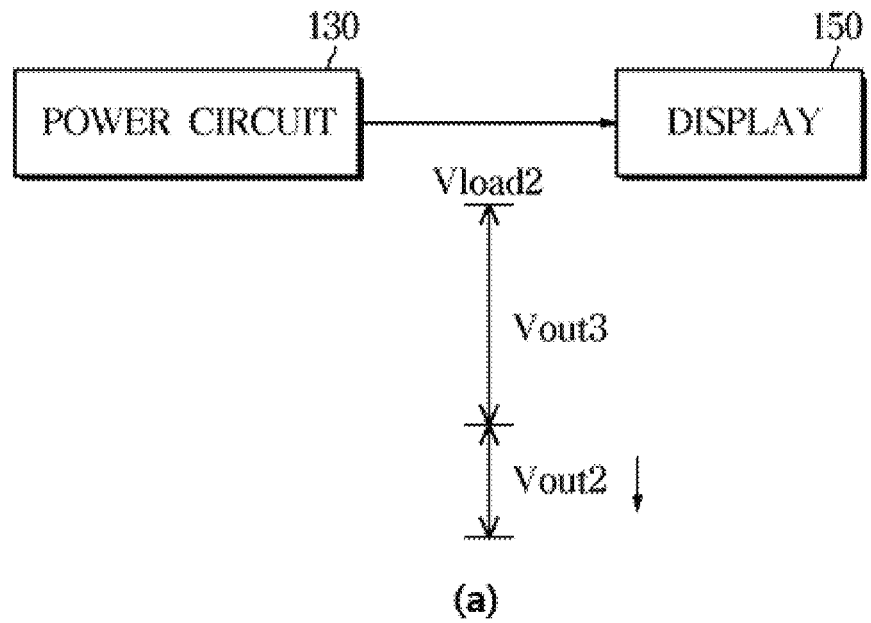
(a)
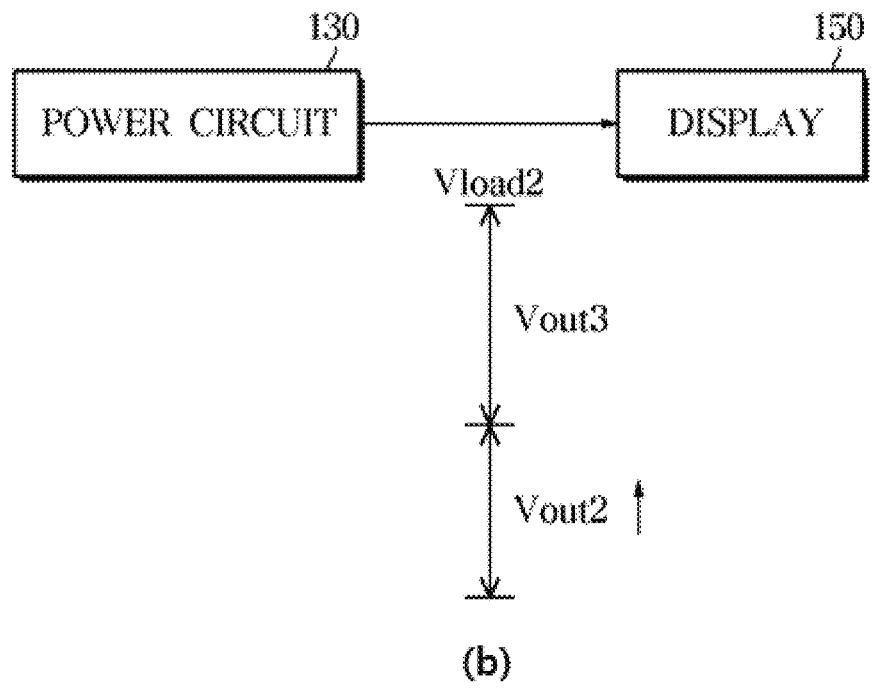
(b)

DISPLAY APPARATUS AND POWER SUPPLY THEREOF

CROSS-REFERENCE TO RELATED APPLICATION

This application is a continuation application of International Application PCT/KR2023/001631, filed on Feb. 6, 2023, which is based on and claims priority to Korean Patent Application No. 10-2022-0063088, filed on May 23, 2022, and Korean Patent Application No. 10-2022-0088540, filed on Jul. 18, 2022, in the Korean Intellectual Property Office, the disclosures of which are incorporated by reference herein in their entireties.

BACKGROUND

1. Field

The disclosure relates to a display apparatus and a power supply thereof, and more particularly, to a display including a power source that outputs different voltages, and a power supply thereof.

2. Description of the Related Art

A display apparatus is an output apparatus for visually displaying image information received from the outside or stored therein. The display apparatus is widely used in various fields and environments, e.g., in the home or in a business environment.

Examples of display apparatuses are a monitor apparatus connected with a personal computer (PC), a server computer, or the like, a portable computer apparatus, a navigation terminal, a television apparatus, an Internet Protocol Television (IPTV) apparatus, a portable terminal (for example, a smart phone, a tablet PC, Personal Digital Assistant (PDA), or a cellular phone), various kinds of displays used to reproduce images of advertisements or movies in industrial fields, and various kinds of audio/video systems.

Due to the enhanced and/or enlarged sizes of display apparatuses (e.g., a display panels), the number of light sources used to generate images is increasing. Additionally, power supplied to the increased number of light sources is increasing. To stably supply power to the increased number of light sources, a power circuit (for example, a capacitor and/or an inductor) that supplies power to the display apparatus is growing in importance.

SUMMARY

Provided are a display including a power source capable of stably outputting different voltages, and a power supply thereof.

Additional aspects of the disclosure will be set forth in part in the description which follows and, in part, will be obvious from the description, or may be learned by practice of the disclosure.

According to an aspect of the disclosure, a display apparatus includes: a display; a processor configured to process image data to be displayed on the display; a transformer including a primary coil and a plurality of secondary coils; a first rectifier connected to a first coil of the plurality of secondary coils, the first rectifier being configured to provide a first output voltage corresponding to a number of turns of the first coil; a direct current-direct current (DC-DC) converter configured to receive the first output voltage from the first rectifier and provide a second output voltage that is different from the first output voltage; and a second rectifier connected to a second coil of the plurality of secondary coils, the second rectifier being configured to provide a first load voltage, which is a sum of the second output voltage and a third output voltage, the third output voltage corresponding to a number of turns of the second coil, to the display.

The processor may be further configured to control the DC-DC converter to adjust the second output voltage based on a brightness corresponding to the image data.

The DC-DC converter may be configured to adjust the second output voltage based on the first load voltage.

The DC-DC converter may include: a buck converter including a switch, a diode, and an inductor; and a duty controller configured to control a duty cycle of the switch, wherein the duty controller may be configured to control the duty cycle of the switch based on the first load voltage and a duty control signal from the processor.

The duty controller may be configured to control the duty cycle of the switch to decrease the second output voltage according to an increase of the first load voltage, and increase the second output voltage according to a decrease of the first load voltage.

The duty controller may be configured to control the duty cycle of the switch to decrease the second output voltage according to an increase of the duty control signal from the processor, and increase the second output voltage according to a decrease of the duty control signal from the processor.

A first load capacitor may be configured to provide the first load voltage; and a linear regulator provided between the second rectifier and the first load capacitor, the first load capacitor may be configured to limit the first load voltage provided from the first load capacitor to a preset range.

The linear regulator may include: a load switch provided between the second rectifier and the first load capacitor, the load switch may be configured to control a connection between the second rectifier and the first load capacitor; a voltage overlapping circuit configured to decrease the first load voltage and a brightness control signal from the processor according to a preset ratio, overlap the first load voltage with the brightness control signal, and provide an overlapping output voltage; and an amplifier configured to provide a voltage control signal for turning on or off the load switch based on a comparison between the overlapping output voltage provided from the voltage overlapping circuit and a preset reference voltage.

The amplifier may be configured to turn off the load switch based on the overlapping output voltage from the voltage overlapping circuit being greater than or equal to the preset reference voltage, and turn on the load switch based on the overlapping output voltage from the voltage overlapping circuit being smaller than the preset reference voltage.

The processor may be configured to decrease a voltage of the brightness control signal based on an increase in a brightness corresponding to the image data, and increase a voltage of the brightness control signal based on a decrease in the brightness corresponding to the image data.

The linear regulator may be configured to, based on a display-off signal being provided from the processor, block the connection between the second rectifier and the first load capacitor.

The linear regulator may further include a cutoff switching circuit provided between the load switch and the amplifier, the linear regulator may be configured to, based on the display-off signal being provided from the processor, transfer a voltage control signal from the amplifier to the load switch and turn off the load switch.

The linear regulator may be configured to change a range of limiting the first load voltage based on the first load voltage and a brightness corresponding to the image data.

The display apparatus may further include an audio interface configured to output sound, wherein the first rectifier may be configured to provide a second load voltage, the second load voltage corresponding to the number of turns of the first coil or half of the number of turns of the first coil, to the audio interface.

The display apparatus may further include a third rectifier connected to a third coil of the plurality of secondary coils, the third rectifier may be configured to provide a third load voltage corresponding to a number of turns of the third coil or half of the number of turns of the third coil, to the processor.

According to an aspect of the disclosure, a power supply includes: a transformer including a primary coil and a plurality of secondary coils; a first rectifier connected to a first coil of the plurality of secondary coils, the first rectifier being configured to provide a first output voltage corresponding to a number of turns of the first coil; a direct current-direct current (DC-DC) converter configured to receive the first output voltage from the first rectifier and provide a second output voltage that is different from the first output voltage; and a second rectifier connected to a second coil of the plurality of secondary coils, the second rectifier being configured to provide a first load voltage, which is a sum of the second output voltage and a third output voltage, the third output voltage corresponding to a number of turns of the second coil.

The DC-DC converter may be further configured to adjust the second output voltage based on the first load voltage.

The DC-DC converter may include: a buck converter including a switch, a diode, and an inductor; and a duty controller configured to control a duty cycle of the switch, wherein the duty controller may be configured to control the duty cycle of the switch based on the first load voltage.

The power supply may further include: a first load capacitor configured to provide the first load voltage; and a linear regulator provided between the second rectifier and the first load capacitor, the linear regulator may be configured to limit the first load voltage provided from the first load capacitor within a preset range.

The linear regulator may include: a load switch provided between the second rectifier and the first load capacitor, the load switch may be configured to control a connection between the second rectifier and the first load capacitor; a voltage divider configured to decrease the first load voltage at a preset ratio and provide the reduced first load voltage; and an amplifier configured to provide a voltage control signal for turning on or off the load switch based on a comparison between the reduced second load voltage from the voltage divider and a preset reference voltage.

According to an aspect of the disclosure, a display apparatus includes: a memory for storing one or more instructions; a processor configured to execute the one or more instructions to: control a first rectifier to provide a first output voltage corresponding to a number of turns of a first coil of the first rectifier; control a direct current-direct current (DC-DC) converter to receive the first output voltage from the first rectifier and provide a second output voltage that is different from the first output voltage; and control a second rectifier to provide a first load voltage, which is a sum of the second output voltage and a third output voltage, the third output voltage corresponding to a number of turns of a second coil, to a display.

The processor may be further configured to control a duty cycle of a switch based on the first load voltage.

The processor may be further configured to control the duty cycle of the switch to decrease the second output voltage according to an increase of the first load voltage, and increase the second output voltage according to a decrease of the first load voltage.

The processor may be further configured to decrease a voltage of a brightness control signal based on an increase in a brightness corresponding to image data, and increase the voltage of the brightness control signal based on a decrease in the brightness corresponding to the image data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates changes of a driving voltage that is supplied to a display of a display apparatus, according to an embodiment of the disclosure;

DETAILED DESCRIPTION

Figure 1:
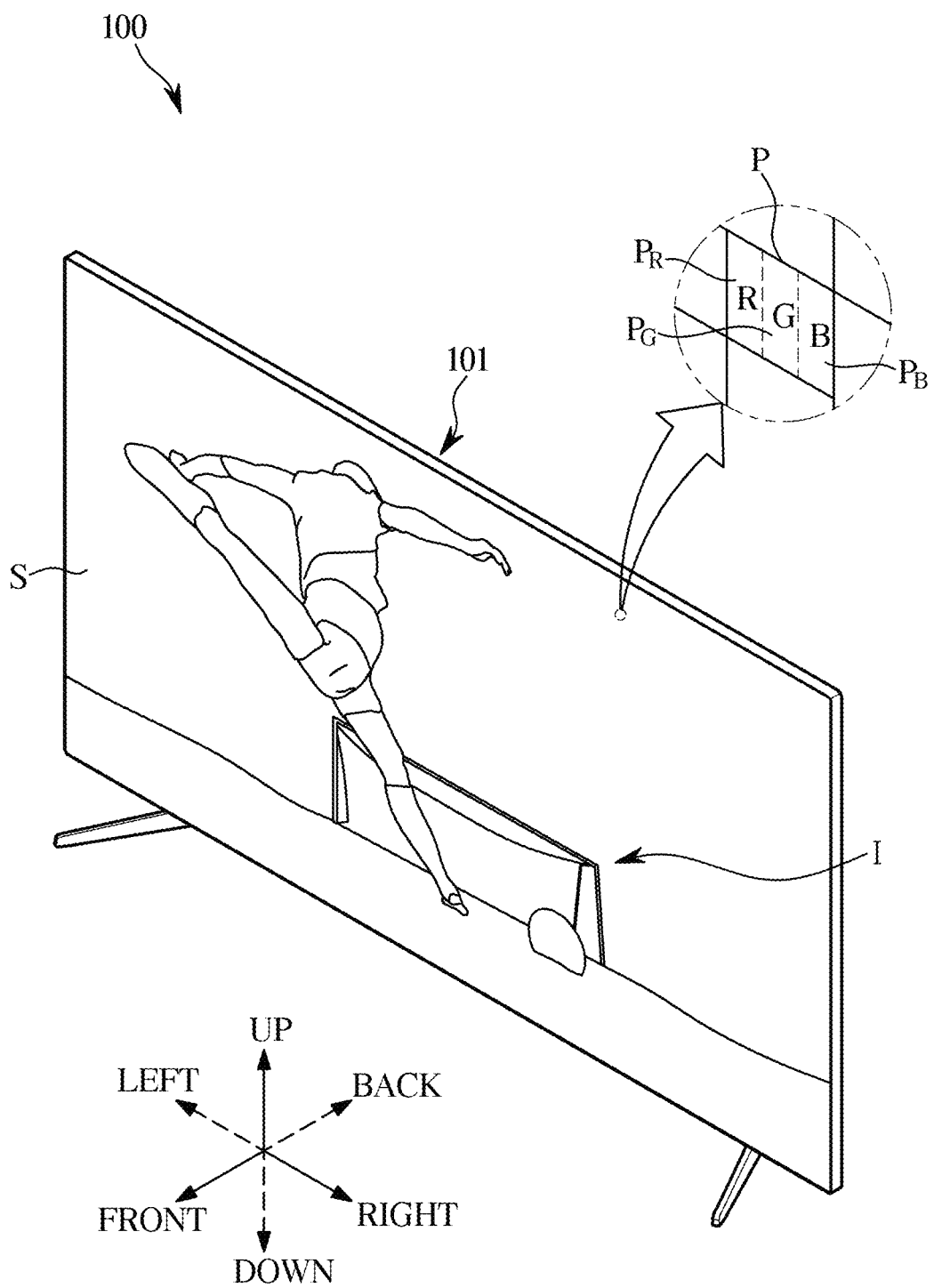
FIG. 1 illustrates a display apparatus, according to an embodiment of the disclosure.

Throughout the disclosure, like reference numerals will refer to like components. The disclosure does not describe all elements of embodiments, and descriptions about content being general in the technical art to which the disclosure belongs or overlapping content between the embodiments will be omitted. As used herein, the terms "portion," "part," "module," "member," or "block" may be implemented as software or hardware, and according to embodiments, a plurality of "portions," "parts," "modules," "members," or "blocks" may be implemented as a single component, or a single "portion," "part," "module," "member," or "block" may include a plurality of components.

Throughout this disclosure, it will be understood that when a certain part is referred to as being "connected" to another part, it can be directly or indirectly connected to the other part. When a part is indirectly connected to another part, it may be connected to the other part through a wireless communication network.

It should be understood that when a certain part "includes" a certain component, the part does not exclude another component but can further include another component, unless the context clearly indicates otherwise.

In the entire specification, it will also be understood that when an element is referred to as being "on" or "over" another element, it can be directly on the other element or intervening elements may also be present.

It will be understood that, although the terms "first," "second," etc., may be used herein to describe various elements, these elements should not be limited by these terms. The above terms are used only to distinguish one component from another.

An expression used in the singular encompasses the expression of the plural, unless it has a clearly different meaning in the context.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Hereinafter, an operation principle and embodiments of the disclosure will be described with reference to the accompanying drawings.

FIG. 1 illustrates an appearance of a display apparatus according to an embodiment of the disclosure.

A display apparatus 100 may be an apparatus for processing an image signal received from outside and visually displaying a processed image. Hereinafter, a case in which the display apparatus 100 is a television (TV) will be described as an example. However, the display apparatus 100 is not limited to a TV. For example, the display apparatus 100 may be implemented as various kinds, such as a monitor, a portable multimedia device, a portable communication device, a portable computation device, etc. However, the display apparatus 100 may be any kind of apparatus that visually displays images.

The display apparatus 100 may be a large format display (LFD) that is installed in an outdoor space, such as the top of building or a bus stop. The outdoor space is not limited to open-air spaces, and the display apparatus 100, according to an embodiment of the disclosure, may be installed in any place where many people visit, such as a subway station, a shopping mall, a theater, an office, a store, etc., although the place is an indoor space.

The display apparatus 100 may receive a video signal and an audio signal from various content sources, and output video and audio corresponding to the video signal and audio signal. For example, the display apparatus 100 may receive television broadcasting content through a broadcasting reception antenna or a wired cable, receive content from a content reproducing apparatus, or receive content from a content providing server of a content provider.

As shown in FIG. 1, the display apparatus 100 may include a main body 101 that accommodates a plurality of components for displaying an image, and a screen S provided on one side of the main body 101 to display an image I.

The main body 101 may form an appearance of the display apparatus 100, and components for enabling the display apparatus 100 to display an image I may be provided inside the main body 101. The main body 101 shown in FIG. 1 may be in a shape of a flat plate. However, the shape of the main body 101 is not limited to the flat plate shown in FIG. 1. For example, the main body 101 may have a shape in which left and right ends protrude in a front direction and of which a center portion is curved concavely.

The screen S may be formed on a front surface of the main body 101, and an image I which is visual information may be displayed on the screen S. For example, a still image or a moving image may be displayed on the screen S, and a two-dimensional image or a three-dimensional image may be displayed on the screen S.

A plurality of pixels P may be formed in the screen S, and an image I displayed on the screen S may be formed by a combination of light emitted from the plurality of pixels P. For example, light emitted from the plurality of pixels P may be combined like mosaic to form an image I on the screen S.

The plurality of pixels P may emit light of various brightness levels and various colors, respectively.

To emit light of various brightness levels, each of the plurality of pixels P may include a component (for example, an organic light emitting diode) capable of itself emitting light, or a component (for example, a liquid crystal panel) capable of transmitting or blocking light emitted by a backlight unit, etc.

To emit light of various colors, each of the plurality of pixels P may include sub pixels Pr, Pg, and Pb.

The sub pixels Pr, Pg, and Pb may include a red sub pixel Pr capable of emitting red light, a green sub pixel Pg capable of emitting green light, and a blue sub pixel Pb capable of emitting blue light. For example, red light may correspond to light of a wavelength ranging from about 620 nm (nanometer, one billionth of a meter) to about 750 nm, green light may correspond to light of a wavelength ranging from about 495 nm to about 570 nm, and blue light may correspond to light of a wavelength ranging from about 450 nm to about 495 nm.

Each of the plurality of pixels P may emit light of various brightness levels and various colors by a combination of red light of the red sub pixel Pr, green light of the green sub pixel Pg, and blue light of the blue sub pixel Pb.

The screen S shown in FIG. 1 is in a shape of a flat plate. However, the shape of the screen S is not limited to the flat plate shown in FIG. 1. For example, the screen S may have a shape in which left and right ends protrude in the front direction and of which a center portion is curved concavely, according to a shape of the main body 101.

Figure 2:
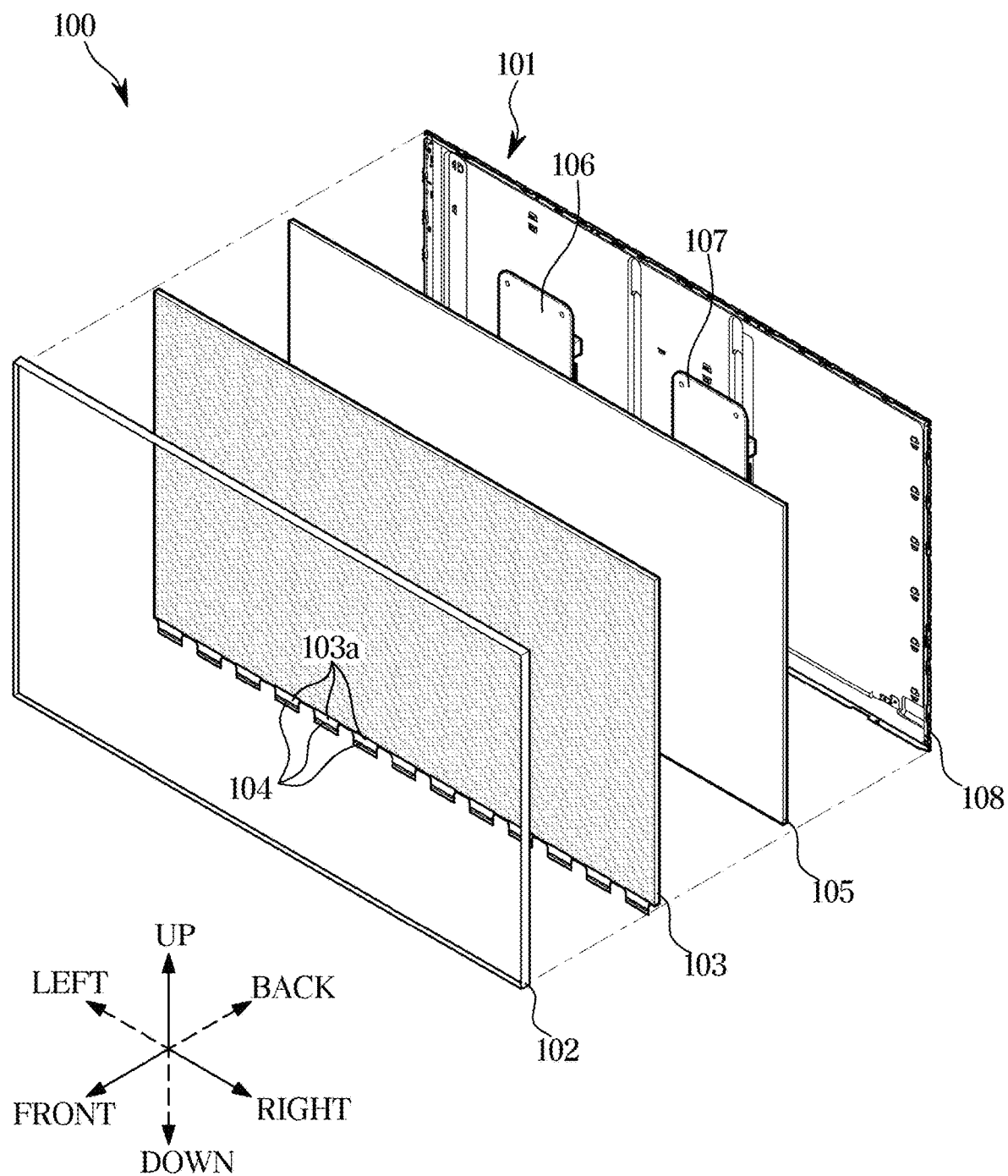
FIG. 2 is an exploded view of a display apparatus, according to an embodiment of the disclosure.

FIG. 2 is an exploded view of a display apparatus, according to an embodiment of the disclosure.

As shown in FIG. 2, the display apparatus 100 may include a display panel 103 that emits light in the front direction to generate an image, a control assembly 106 on which a component for controlling operations of the display panel 103 is mounted, a power assembly 107, on which a component for supplying power to the display panel 103 and the control assembly 106 is mounted, a bottom chassis 105 that supports/fixes the control assembly 106 and the power assembly 107, and a bezel 102 and a rear cover 108 that prevent the display panel 103, the control assembly 106, and the power assembly 107 from being exposed to the outside.

A front surface (a light emitting surface) of the display panel 103 may form the above-described screen S of the display apparatus 100, and the pixels P or sub pixels Pr, Pg, and Pb, as described above, may be formed on the display panel 103.

The display panel 103 may be one of various types of display panels capable of displaying an image I. For example, the display panel 103 may be a Liquid Crystal Display (LCD) panel, a Light Emitting Diode (LED) panel, an Organic Light Emitting Diode (OLED) panel, a Quantum Dot Light Emitting Diode (QLED) panel, or a Quantum Dot Display (QD) panel.

On one side of the display panel 103, a cable 103*a* for transmitting image data to the display panel 103, and a Display Driver Integrated Circuit (DDI) (hereinafter, referred to as a 'driver IC') 104 for processing digital image data and outputting an analog image signal may be provided.

The cable 103*a* may electrically connect the control assembly 106 and the power assembly 107 with the driver IC 104, and electrically connect the driver IC 104 with the display panel 103. The cable 103*a* may include a flexible flat cable or a film cable.

The driver IC 104 may receive image data and power from the control assembly 106 and the power assembly 107 through the cable 103*a*, and supply an image signal and driving current to the display panel 103 through the cable 103*a*.

The cable 103*a* and the driver IC 104 may be integrated into a film cable, a chip on film (COF), a tape carrier packet (TCP), etc. In other words, the driver IC 104 may be positioned on the cable 103*a*, although not limited thereto. However, the driver IC 104 may be positioned on the display panel 103 or the control assembly 106.

The control assembly 106 may include a control circuit (or a processing circuit) for controlling operations of the display panel 103 and processing images. The control circuit may process image data received from an external content source, and transmit image data to the display panel 103 such that the plurality of pixels P emit light having different colors and different brightness levels, respectively.

The power assembly 107 may include a part of a power circuit for supplying power to the control assembly 106 and/or the display panel 103. For example, another part of the power circuit may be provided in an adapter 200, the control assembly 106 may be implemented as a printed circuit board and a control circuit mounted on the printed circuit board, and the power assembly 107 may be implemented as a printed circuit board and a power circuit mounted on the printed circuit board. For example, the control circuit may include a memory, a microprocessor, and a control circuit board on which the memory and the microprocessor are mounted. Also, the power circuit may include a capacitor, a coil, a resistor device, a microprocessor, and a power circuit board on which the capacitor, the coil, the resistor device, and the microprocessor are mounted.

Figure 3:
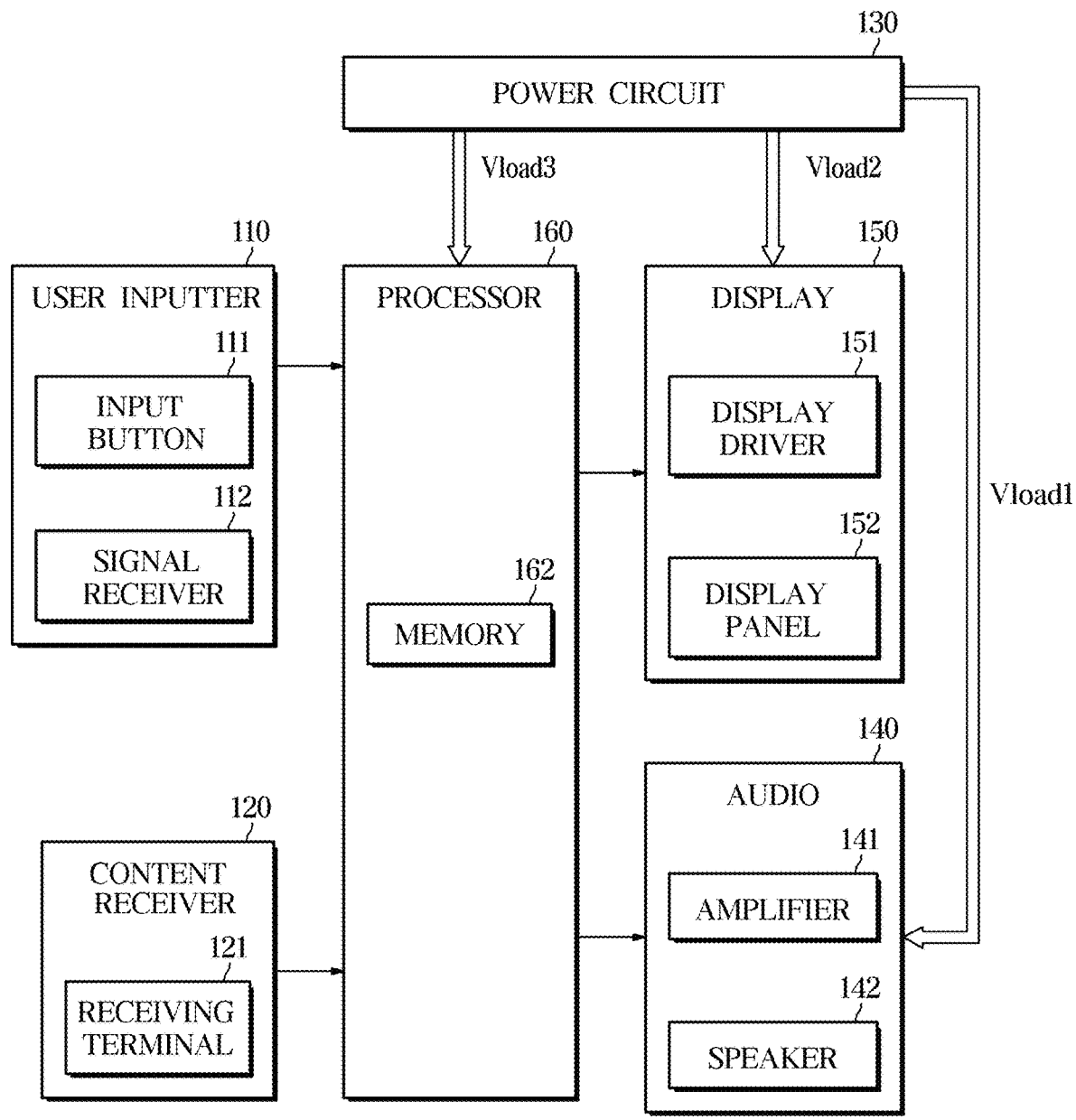
FIG. 3 illustrates a configuration of a display apparatus, according to an embodiment of the disclosure.
Figure 4:
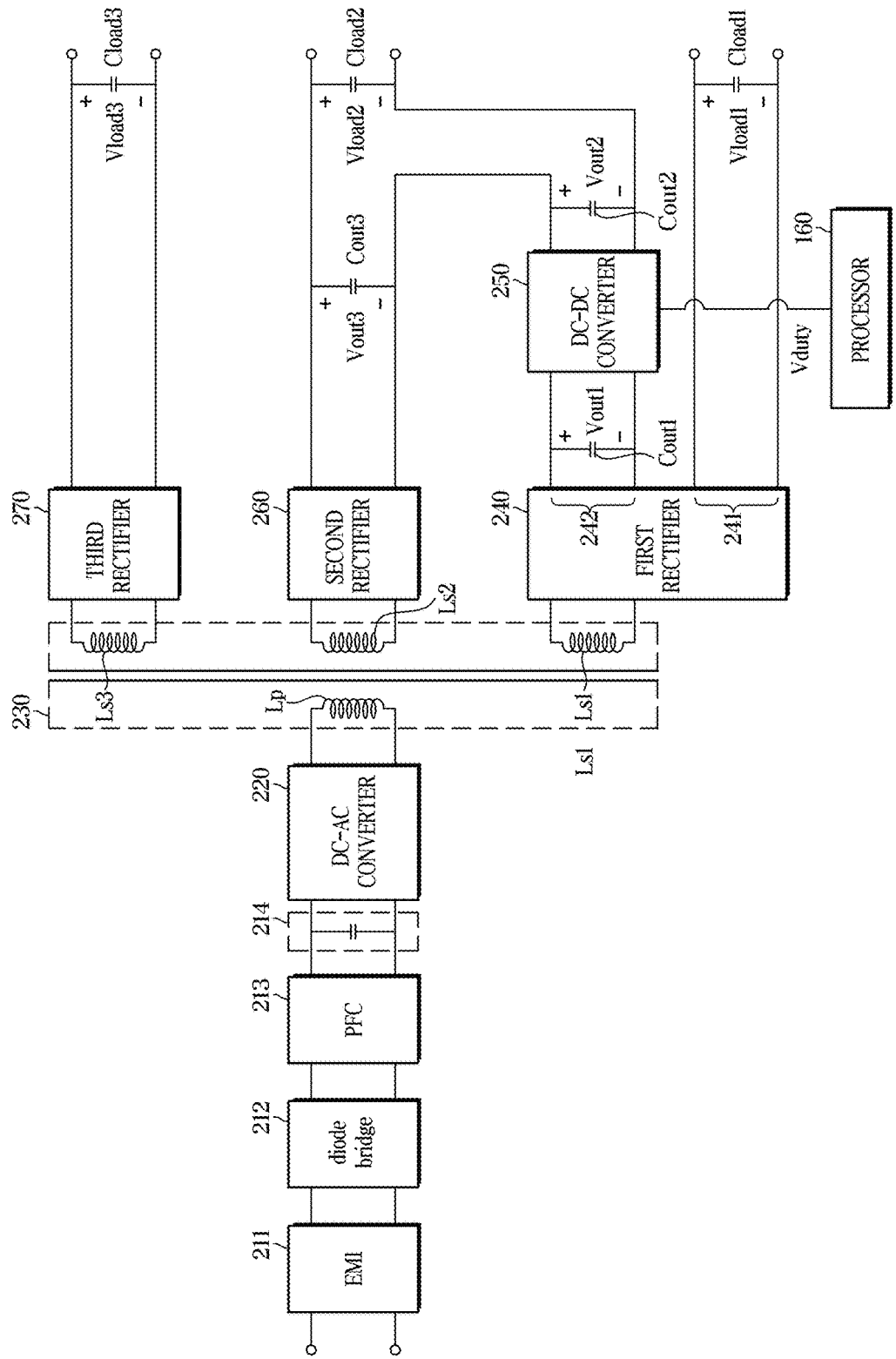
FIG. 4 illustrates a configuration of a power circuit included in a display apparatus, according to an embodiment of the disclosure.

FIG. 3 illustrates a configuration of a display apparatus, according to an embodiment of the disclosure. FIG. 4 illustrates a configuration of a power circuit included in a display apparatus, according to an embodiment of the disclosure.

Referring to FIGS. 3 and 4, the display apparatus 100 may include a user inputter 110 for receiving a user input from a user, a content receiver 120 for receiving a video signal and/or an audio signal from content sources, a processor 160 for processing a video signal and/or an audio signal received by the content receiver 120 and controlling operations of the display apparatus 100, a power circuit 130 for supplying power to components of the display apparatus 100, an audio 140 for outputting sound processed by the processor 160, and a display 150 for displaying an image processed by the processor 160.

One or more components shown in FIGS. 3 and 4 may be omitted.

The user inputter 110 may include an input button 111 for receiving a user input. For example, the user inputter 110 may include a power button for obtaining a user input of turning on or off the display apparatus 100, a sound control button for obtaining a user input of controlling a volume of sound output from the display apparatus 100, and a source selection button for obtaining a user input of selecting a content source.

The input button 111 may receive a user input, and output an electrical signal corresponding to the user input to the processor 160. The input button 111 may include a tact switch, a push switch, a slide switch, a toggle switch, a micro switch, or a touch switch.

The user inputter 110 may include a signal receiver 112 for receiving a remote control signal from a remote controller. The remote controller for receiving a user input may be separated from the display apparatus 100, receive a user input, and transmit a wireless signal corresponding to the user input to the display apparatus 100. The signal receiver 112 may receive a wireless signal corresponding to a user input from the remote controller, and output an electrical signal corresponding to the user input to the processor 160.

The content receiver 120 may include a receiving terminal 121 for receiving content including a video signal and/or an audio signal from content sources.

The receiving terminal 121 may receive a video signal and an audio signal from content sources through a cable. For example, the receiving terminal 121 may include a component (YPbPr/RGB) terminal, a composite video blanking and sync (CVBS) terminal, an audio terminal, a High Definition Multimedia Interface (HDMI) terminal, an Universal Serial Bus (USB) terminal, etc.

The content receiver 120 may further include a tuner. The tuner may receive broadcasting signals from a broadcasting reception antenna or a wired cable, and extract a broadcasting signal of a channel selected by a user from among the broadcasting signals. For example, the tuner may pass a broadcasting signal having a frequency corresponding to a channel selected by a user among a plurality of broadcasting signals received through a broadcasting reception antenna or a wired cable, and block the broadcasting signals having the other frequencies.

As such, the content receiver 120 may receive a video signal and an audio signal from content sources through the receiving terminal 121, and output the video signal and/or the audio signal received through the receiving terminal 121 to the processor 160.

The processor 160 may process the video signal and/or the audio signal.

The processor 160 may include a memory 162 that memorizes/stores data. The processor 160 and the memory 162 may be implemented as separate semiconductor devices (chips) or as a single semiconductor device (chip). Also, the processor 160 may include a plurality of processors or a plurality of memories.

The memory 162 may store a program and data for processing a video signal and/or an audio signal, and temporarily memorize data generated while processing the video signal and/or the audio signal.

The memory 162 may include a non-volatile memory, such as Read Only Memory (ROM) and a flash memory, for storing data for a long time, and a volatile memory, such as Static Random Access Memory (S-RAM) and Dynamic Random Access Memory (D-RAM), for temporarily memorizing data.

The processor 160 may receive a video signal and/or an audio signal from the content receiver 120, decode the video signal to generate image data, and decode the audio signal to generate audio data. The image data and audio data may be output to the display 150 and the audio 140, respectively.

The processor 160 may process a video signal and/or an audio signal received by the content receiver 120, and reproduce an image and sound from the video signal and/or audio signal. More specifically, the processor 160 may decode a video signal and/or an audio signal to image data and audio data.

The processor 160 may generate a control signal for controlling the content receiver 120, the display 150, and/or the audio 140.

The processor 160 may be implemented as a control circuit in the control assembly 106.

The audio interface 140 may include an amplifier 141 for amplifying sound and a speaker 142 for acoustically outputting the amplified sound.

The speaker 142 may convert an analog sound signal amplified by the amplifier 141 into sound (sound wave). For example, the speaker 142 may include a thin film vibrating according to an electrical sound signal, and a sound wave may be generated by vibrations of the thin film.

The display 150 may include a display panel 152 for visually outputting image data, and a display driver 151 for providing image data to the display panel 152 and driving the display panel 152.

The display panel 152 may generate an image according to image data received from the display driver 151, and display the image.

The display panel 152 may include a plurality of pixels each being a unit of displaying an image. Each pixel may receive an electrical signal representing an image from the display driver 151, and output an optical signal corresponding to the received electrical signal. The plurality of pixels may be arranged, for example, in a plurality of rows (e.g., a plurality of pixel rows) and a plurality of columns (e.g., a plurality of pixel columns). Optical signals output from the plurality of pixels arranged in a two-dimensional matrix form may be combined to generate an image, and the image may be displayed on the display panel 152.

The display panel 152 may be, e.g., a liquid crystal display panel, a light emitting diode panel, and/or a quantum dot display panel.

The liquid crystal display panel may include a backlight unit that emits surface light in the front direction, and a liquid crystal panel that blocks or passes light emitted from the backlight unit. The backlight unit may include a point light source (for example, a light emitting diode, etc.) that emits monochromatic light or white light, and an optical member (for example, a light guide plate, a diffuser plate, etc.) that diffuses light emitted from the point light source to uniform surface light. The liquid crystal panel may include a plurality of pixels P, and each of the plurality of pixels P may block or pass light emitted from the backlight unit, independently. Light passed through the plurality of pixels P may be tinged with a color (for example, red, green, or blue) by a color filter, and form an image.

The light emitting diode panel may include a plurality of light emitting diodes, and each of the plurality of light emitting diodes may emit light having a preset wavelength. For example, each of the plurality of light emitting diodes may emit any one light of red light, green light, or blue light, and form a sub pixel. Light emitted from each of the plurality of light emitting diodes may from an image.

The display driver 151 may be implemented as a driver IC 104.

The display driver 151 may include a scan driver, a data driver, and a timing controller. The scan driver may provide a scan signal for activating any one of the plurality of pixel rows to the display panel 152 according to a control by the timing controller. The data driver may obtain image data sequentially from the processor 160, and provide an analog signal corresponding to the image data to the plurality of pixel columns included in the display panel 152 according to a control by the timing controller. The timing controller may control the scan driver and the data driver to sequentially provide image data to the plurality of pixels.

The power circuit 130 may supply power to all electrical components included in the display apparatus 100. The power circuit 130 may supply power to, for example, the display 150, the audio 140, and the processor 160. The power circuit 130 may supply power having different voltages to the display 150, the audio 140, and the processor 160, respectively. The power circuit 130 may output a second load voltage Vload2 to the audio 140, a first load voltage Vload1 to the display 150, and a third load voltage Vload3 to the processor 160.

In regards to power, the display apparatus 100 may be in three states, and power may be supplied to the processor 160 or the display 150 or power may be blocked from being supplied to the processor 160 or the display 150 depending on a power state of the display apparatus 100.

The display apparatus 100 may be in an "off state," in which a plug is not inserted in a power socket. In the "off state," no power may be supplied to most electrical components included in the display apparatus 100. However, power from a battery may be supplied to some components of the display apparatus 100.

The display apparatus 100 may be in a "standby state" in which the plug is inserted in the power socket and a power supply command (or an operation command) from a user is not input. In the "standby state," power may be supplied to some of the components included in the display apparatus 100. For example, in the "standby state," power may be supplied to the processor 160, and no power may be supplied to the display 150, etc.

The display apparatus 100 may be in an "on state" in which the plug of the display apparatus 100 is inserted in the power socket and a power supply command (or an operation command) from a user is input. In the "on state," power may be supplied to all the components included in the display apparatus 100. for example, in the "on state," power may be supplied to both the processor 160 and the display 150.

The power circuit 130 may include, as shown in FIG. 4, for example, an Electro Magnetic Interface (EMI) filter 211, a diode bridge 212, a Power Factor Correction (PFC) circuit 213, a direct current link capacitor 214, a Direct Current-Alternating Current (DC-AC) converter 220, a transformer 230, a first rectifier 240, a Direct Current-Direct Current (DC-DC) converter 250, a second rectifier 260, and a third rectifier 270.

The EMI filter 211 may suppress or block noise included in external alternating current power supplied from an external power source. For example, the EMI filter 211 may block a high frequency component included in external alternating current power, and pass alternating current power of a low frequency (for example, 60 Hz or 50 Hz).

The diode bridge 212 may rectify external alternating current power supplied from an external power source. For example, the diode bridge 212 may receive a negative voltage and a positive voltage alternately, and output the positive voltage. Also, the diode bridge 212 may receive alternating current flowing in a negative direction and a positive direction and output current flowing in the positive direction. A voltage rectified by the diode bridge 212 may include a direct current component (direct current voltage) and an alternating current component (ripple).

The PFC circuit 213 may adjust a phase of alternating current power to be supplied to the display apparatus 100 such that external alternating current power supplied from an external power source is effectively supplied to the display apparatus 100. A power factor may represent a ratio of active power with respect to apparent power. The apparent power may represent power that is supplied from an external power source to the display apparatus 100 in external appearance, and active power may represent power that is substantially supplied to the display apparatus 100 and consumed by the display apparatus 100. Generally, in a case in which a phase of a voltage applied from an external alternating current power source is identical to a phase of current consumed by the display apparatus 100, a power factor may be high, and as a difference between a phase of an external voltage and a phase of consumption current increases, a power factor may be lowered.

The PFC circuit 213 may adjust a phase of current that is supplied from an external power source to the display apparatus 100 such that a difference between a phase of an external voltage and a phase of consumption current is reduced (for example, such that a phase of an external voltage is identical to a phase of consumption current).

The direct current link capacitor 214 may stabilize a voltage rectified by the diode bridge 212. For example, the direct current link capacitor 214 may remove an alternating current component (ripple) of a rectified voltage, and output a direct current voltage. An output voltage value of the direct current link capacitor 214 may be similar to a maximum value of an external alternating current voltage. For example, upon supplying of an alternating current voltage of 220 V as an active value, an output voltage of the direct current link capacitor 214 may be about 310 V.

A direct current-alternating current (DC-AC) converter 220 may convert a direct current voltage and direct current output from the direct current link capacitor 214 into an alternating current voltage and alternating current. For example, the DC-AC converter 220 may include a plurality of switches, and output alternating current and an alternating current voltage that change over time according to opening/closing of the plurality of switches.

The transformer 230 may include a plurality of coils Lp, Ls1, Ls2, and Ls3 that may transmit and receive magnetic energy. For example, the transformer 230 may include a primary coil Lp connected with the DC-AC converter 220 to emit magnetic energy corresponding to alternating current power of the DC-AC converter 220, and a plurality of secondary coils Ls1, Ls2, and Ls3 respectively connected with the plurality of rectifiers 240, 260, and 270 to receive magnetic energy.

The primary coil Lp may be magnetically associated with the plurality of secondary coils Ls1, Ls2, and Ls3 through a core. For example, the core may guide magnetic energy emitted from the primary coil Lp to the plurality of secondary coils Ls1, Ls2, and Ls3. Accordingly, the magnetic energy emitted from the primary coil Lp may pass through the plurality of secondary coils Ls1, Ls2, and Ls3.

The plurality of secondary coils Ls1, Ls2, and Ls3 may include a first coil Ls1 that transfers alternating current power corresponding to magnetic energy of the core of the transformer 230 to the first rectifier 240, a second coil Ls2 that transfers the alternating current power corresponding to the magnetic energy of the core of the transformer 230 to the second rectifier 260, and a third coil Ls3 that transfers the alternating current power corresponding to the magnetic energy of the core of the transformer 230 to the third rectifier 270.

The transformer 230 may output an alternating current voltage increased or decreased according to a ratio of a number of turns of the primary coil Lp and a number of turns of each of the plurality of secondary coils Ls1, Ls2, and Ls3. As such, the transformer 230 may output alternating current power of a voltage corresponding to each of the plurality of secondary coils Ls1, Ls2, and Ls3 through each of the plurality of secondary coils Ls1, Ls2, and Ls3.

For example, the transformer 230 may output alternating current power stepped up or down from alternating current power of the DC-AC converter 220 according to a ratio of the number of turns of the primary coil Lp and a number of turns of the first coil Ls1, to the first rectifier 240. The transformer 230 may output alternating current power having a voltage corresponding to the number of turns of the first coil Ls1 to the first rectifier 240.

The transformer 230 may output alternating current power stepped up or down from alternating current power of the DC-AC converter 220 according to a ratio of the number of turns of the primary coil Lp and a number of turns of the second coil Ls2, to the second rectifier 260. The transformer 230 may output alternating current power having a voltage corresponding to the number of turns of the second coil Ls2 to the second rectifier 260.

The transformer 230 may output alternating current power stepped up or down from alternating current power of the DC-AC converter 220 according to a ratio of the number of turns of the primary coil Lp and a number of turns of the third coil Ls3, to the third rectifier 270. The transformer 230 may output alternating current power having a voltage corresponding to the number of turns of the third coil Ls2 to the third rectifier 270.

Also, the transformer 230 may electrically separate internal components of the display apparatus 100 from an external alternating current power source. Accordingly, any sharp voltage variation (for example, a surge voltage) from the external alternating current power source may be blocked by the transformer 230 without being transferred to the internal components of the display apparatus 100.

The first rectifier 240 may rectify alternating current power output from the first coil Ls1 of the transformer 230. For example, the first rectifier 240 may receive an alternating current voltage that is applied as a negative voltage and a positive voltage alternately from the first coil Ls1 of the transformer 230, and output the positive voltage. Also, the second rectifier 260 may receive alternating current that flows in a negative direction and a positive direction alternately from the second coil Ls2 of the transformer 230, and provide the current flowing in the positive direction.

The first rectifier 240 may include two output terminals, and output different voltages. For example, the first rectifier 240 may include a full bridge rectifier and a center tap rectifier. The full bridge rectifier may output a voltage corresponding to the number of turns of the first coil Ls1, and the center tap rectifier may output a voltage corresponding to half of the number of turns of the first coil Ls1.

In a first output terminal 241 of the first rectifier 240, a first load capacitor Cload1 may be provided. The first load capacitor Cload1 may stabilize a voltage of power rectified by the first rectifier 240.

The first load capacitor Cload1 may output a first load voltage Vload1. The first load voltage Vload1 may have a magnitude corresponding to the number of turns of the first coil Ls1 of the transformer 230, or a magnitude corresponding to half of the number of turns of the first coil Ls1.

For example, in a case in which the first rectifier 240 includes a full bridge rectifier, the first rectifier 240 may rectify alternating current power having a voltage corresponding to the number of turns of the first coil Ls1, and accordingly, the first rectifier 240 may output a rectified voltage corresponding to the number of turns of the first coil Ls1. Also, because the first load capacitor Cload1 stabilizes a voltage rectified by the first rectifier 240, the first load capacitor Cload1 may output a direct current voltage corresponding to the number of turns of the first coil Ls1. Accordingly, the first load voltage Vload1 output from the first load capacitor Cload1 may correspond to the number of turns of the first coil Ls1.

As another example, in a case in which the first rectifier 240 includes a center tap rectifier, the first rectifier 240 may rectify alternating current power having a voltage corresponding to half of the number of turns of the first coil Ls1, and accordingly, the first rectifier 240 may output a rectified voltage corresponding to half of the number of turns of the first coil Ls1. Also, because the first load capacitor Cload1 stabilizes a voltage rectified by the first rectifier 240, the first load capacitor Cload1 may output a direct current voltage corresponding to half of the number of turns of the first coil Ls1. Accordingly, the first load voltage Vload1 output from the first load capacitor Cload1 may correspond to half of the number of turns of the first coil Ls1.

A negative terminal of the first load capacitor Cload1 may be connected with a ground of the display apparatus 100. A reference potential of the first load voltage Vload1 output from the first load capacitor Cload1 may be equal to a ground potential of the display apparatus 100.

In a second output terminal 242 of the first rectifier 240, a first output capacitor Cout1 may be provided. The first output capacitor Cout1 may stabilize a voltage of power rectified by the first rectifier 240.

The first output capacitor Cout1 may output a first output voltage Vout1. The first rectifier 240 may include a full bridge rectifier or a center tap rectifier, and the first output voltage Vout1 may have a magnitude corresponding to the number of turns of the first coil Ls1 of the transformer 230 or a magnitude corresponding to half of the number of turns of the first coil Ls1.

The first output voltage Vout1 may be equal to or different from the first load voltage Vload1. For example, the full bridge rectifier of the first rectifier 240 may output the first output voltage Vout1, and the center tap rectifier of the first rectifier 240 may output the first load voltage Vload1. As another example, the full bridge rectifier or the center tap rectifier of the first rectifier 240 may output both the first output voltage Vout1 and the first load voltage Vload1. As another example, the full bridge rectifier of the first rectifier 240 may output the first load voltage Vload1, and the center tap rectifier of the first rectifier 240 may output the first output voltage Vout1.

A negative terminal of the first output capacitor Cout1 may be connected with the ground of the display apparatus 100. A reference potential of the first output voltage Vout1 output from the first output capacitor Cout1 may be equal to the ground potential of the display apparatus 100.

The DC-DC converter 250 may convert the first output voltage Vout1 output from the first output capacitor Cout1 into a second output voltage Vout2 which is different from the first output voltage Vout1, and output the second output voltage Vout2. For example, the DC-DC converter 250 may step down the first output voltage Vout1, and output the second output voltage Vout2 which is smaller than the first output voltage Vout1.

The DC-DC converter 250 may control a magnitude of the second output voltage Vout2. For example, the DC-DC converter 250 may include a switching circuit that is controlled by a controller. The DC-DC converter 250 may change the second output voltage Vout2 by changing a duty cycle of the switching circuit.

The DC-DC converter 250 may receive a duty control signal Vduty for controlling the duty cycle of the switching circuit from the processor 160.

A voltage that is applied to the display panel 152 may change according to brightness of the display panel 152. For example, the display panel 152 may include a light emitting diode for outputting an image. As current supplied to the light emitting diode increases, intensity of light output from the light emitting diode may increase, and as current supplied to the light emitting diode decreases, intensity of light output from the light emitting diode may decrease. Also, as current supplied to the light emitting diode increases, a voltage drop of the light emitting diode may increase, and as current supplied to the light emitting diode decreases, a voltage drop of the light emitting diode may decrease. Accordingly, as intensity of light output from the light emitting diode increases, a voltage drop of the light emitting diode may increase, and as intensity of light output from the light emitting diode decrease, a voltage drop of the light emitting diode may decrease.

For example, as brightness of the display panel 152 increases, a voltage that needs to be applied to the display panel 152 may increase, and as brightness of the display panel decrease, a voltage that needs to be applied to the display panel 152 may decrease.

The processor 160 may identify maximum brightness and average brightness of an image based on a result of processing on image data, and identify a voltage that is to be applied to the display panel 152 based on the maximum brightness and average brightness of the image. The processor 160 may output a duty control signal Vduty to the DC-DC converter 250 based on a magnitude of a voltage that is to be applied to the display panel 152.

The DC-DC converter 250 may control a magnitude of the second output voltage Vout2 based on the duty control signal Vduty from the processor 160.

In an output terminal of the DC-DC converter 250, a second output capacitor Cout2 may be provided. The second output capacitor Cout2 may stabilize the second output voltage Vout2 output from the DC-DC converter 250, and output the stabilized second output voltage Vout2.

A negative terminal of the second output capacitor Cout2 may be connected with the ground of the display apparatus 100. A reference potential of the second output voltage Vout2 output from the second output capacitor Cout2 may be equal to the ground potential of the display apparatus 100. For example, a negative potential of the second output capacitor Cout2 may be substantially equal to a reference potential (for example, the ground potential of the display apparatus 100), and a positive potential of the second output capacitor Cout2 may be substantially equal to the second output voltage Vout2.

The second rectifier 260 may rectify alternating current power output from the second coil Ls2 of the transformer 230. An operation of the second rectifier 260 may be similar to an operation of the first rectifier 240.

In an output terminal of the second rectifier 260, a third output capacitor Cout3 may be provided. The third output capacitor Cout3 may stabilize a voltage of power rectified by the second rectifier 260.

The third output capacitor Cout3 may output a third output voltage Vout3. The second rectifier 260 may include, for example, a full bridge rectifier or a center tap rectifier, and the third output voltage Vout3 may have a magnitude corresponding to the number of turns of the second coil Ls2 of the transformer 230 or a magnitude corresponding to half of the number of turns of the second coil Ls2.

A negative terminal of the third output capacitor Cout3 may be not connected with the ground of the display apparatus 100. A reference potential of the third output voltage Vout3 output from the third output capacitor Cout3 may change. Accordingly, while a potential difference between the positive terminal and the negative terminal of the third output capacitor Cout3 is maintained at the third output voltage Vout3, a positive potential and a negative potential of the third output capacitor Cout3 with respect to the reference potential (for example, the ground potential of the display apparatus 100) may change.

The negative terminal of the third output capacitor Cout3 may be connected with the positive terminal of the second output capacitor Cout2. For example, the third output capacitor Cout3 may be connected in series with the second output capacitor Cout2. Accordingly, a voltage corresponding to a sum of the third output voltage Vout3 and the second output voltage Vout2 may be output between both terminals of the third output capacitor Cout3 and the second output capacitor Cout2.

A second load capacitor Vout2 may be provided between the positive terminal of the third capacitor Cout3 and the negative terminal of the second output capacitor Cout2. The second load capacitor Vout2 may output the second load voltage Vout2, and the second load voltage Vout2 may be equal to a sum of the third output voltage Vout3 and the second output voltage Vout2.

The third rectifier 270 may rectify alternating current power output from the third coil Ls3 of the transformer 230. An operation of the third rectifier 270 may be similar to an operation of the second rectifier 260.

In an output terminal of the third rectifier 270, a third load capacitor Cload3 may be provided. The third load capacitor Cload3 may stabilize a voltage of power rectified by the third rectifier 270.

The third load capacitor Cload3 may output the third load voltage Vload3. The third rectifier 270 may include, for example, a full bridge rectifier or a center tap rectifier, and the third load voltage Vload3 may have a magnitude corresponding to the number of turns of the third coil Ls3 of the transformer 230 or a magnitude corresponding to half of the number of turns of the third coil Ls3.

A negative terminal of the third load capacitor Cload3 may be connected with the ground of the display apparatus 100. Accordingly, a reference potential of the third load voltage Vload3 output from the third load capacitor Cload3 may be equal to the ground potential of the display apparatus 100.

As described above, the first rectifier 240 may output a first output voltage Vout1 corresponding to the number of turns of the first coil Ls1 and a first load voltage Vload1 corresponding to the number of turns of the first coil Ls1 or half of the number of turns of the first coil Ls1. The DC-DC converter 250 may convert the first output voltage Vout1 of the first rectifier 240 into a second output voltage Vout2. The second rectifier 260 may output a third output voltage Vout3 corresponding to the number of turns of the second coil Ls2. A second load voltage Vload2 corresponding to a sum of the second output voltage Vout2 and the third output voltage Vout3 may be output. Also, the third rectifier 270 may output a third load voltage Vload3 corresponding to the number of turns of the third coil Ls3 or half of the number of turns of the third coil Ls3.

The power circuit 130 may output the first load voltage Vload1, the second load voltage Vload2, and the third load voltage Vload3. In this case, the second load voltage Vload2 may change according to a control by the processor 160.

Figure 5:
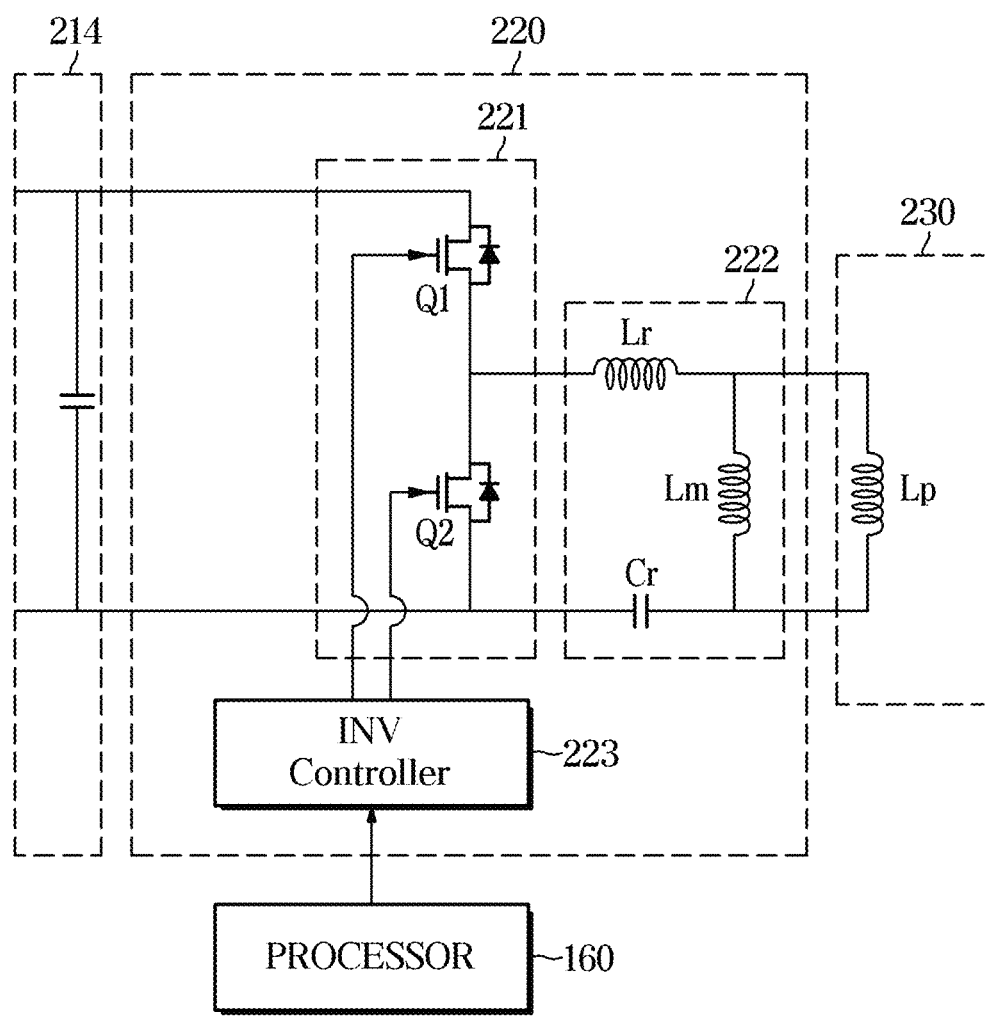
FIG. 5 illustrates a primary side circuit of a power circuit included in a display apparatus, according to an embodiment of the disclosure.

FIG. 5 illustrates a primary side circuit of a power circuit included in a display apparatus, according to an embodiment of the disclosure. More specifically, FIG. 5 illustrates a circuit configuration of the DC-AC converter 220.

The DC-AC converter 220 may include a half bridge inverter 221 configured with a pair of switches Q1 and Q2 connected in series between a positive line and a negative line, a resonant tank 222 including a resonant inductor Lr, a resonant capacitor Cr, and a magnetizing inductor Lm, and an inverter controller 223 for controlling the switches Q1 and Q2 of the half bridge inverter 221.

One or more of the components shown in FIG. 5 may be omitted.

The inverter controller 223 may provide a control signal for alternately turning on/off the switch Q1 and the switch Q2 to the switch Q1 and the switch Q2.

While the switch Q1 is in a turned-on state and the switch Q2 is in a turned-off state, current may be transmitted through the switch Q1 and flow to the resonant tank 222 and the primary coil Lp, and while the switch Q1 is in a turned-off state and the switch Q2 is in a turned-on state, current may be transmitted through the switch Q2 from the resonant tank 222 and the primary coil Lp.

As such, while the switch Q1 and the switch Q2 are switched alternately, resonance may occur between the resonant inductor Lr and the resonant capacitor Cr of the resonant tank 222. The resonant tank 222 may operate as a current source by resonance. Also, due to phase shifts of the resonant inductor Lr and the resonant capacitor Cr, Zero Voltage Switching (ZVS) of the switches Q1 and Q2 may be possible. Also, because the magnetizing inductor Lm participates in resonance, efficiency of the DC-AC converter 220 may be improved.

Accordingly, the DC-AC converter 220 may supply alternating current of which a direction changes over time to the primary coil Lp.

The inverter controller 223 may control power to be transferred to the transformer 230 in response to a control signal from the processor 160.

The processor 160 may transfer a control signal for increasing or decreasing the third load voltage Vload3 to the inverter controller 223, based on a computation amount required for processing image data and/or the third load voltage Vload3.

The inverter controller 223 may control a switching frequency for alternately turning on/off the switch Q1 and the switch Q2 to control power to be transferred to the primary coil Lp of the transformer 230. For example, the inverter controller 223 may control a switching frequency to be close to a resonance frequency of the resonant tank 222 to increase power that is to be transferred to a secondary side of the transformer 230. Also, the inverter controller 223 may control a switching frequency to be distant from the resonance frequency of the resonant tank 222 to decrease power that is to be transferred to the secondary side of the transformer 230.

By increasing power transferred to the primary coil Lp of the transformer 230, power transferred to the plurality of secondary coils Ls1, Ls2, and Ls3 may also increase, and a voltage output from the plurality of secondary coils Ls1, Ls2, and Ls3 may also increase.

Accordingly, the first load voltage Vload1, the second load voltage Vload2, and the third load voltage Vload3 that are output from the power circuit 130 may also increase.

Figure 6:
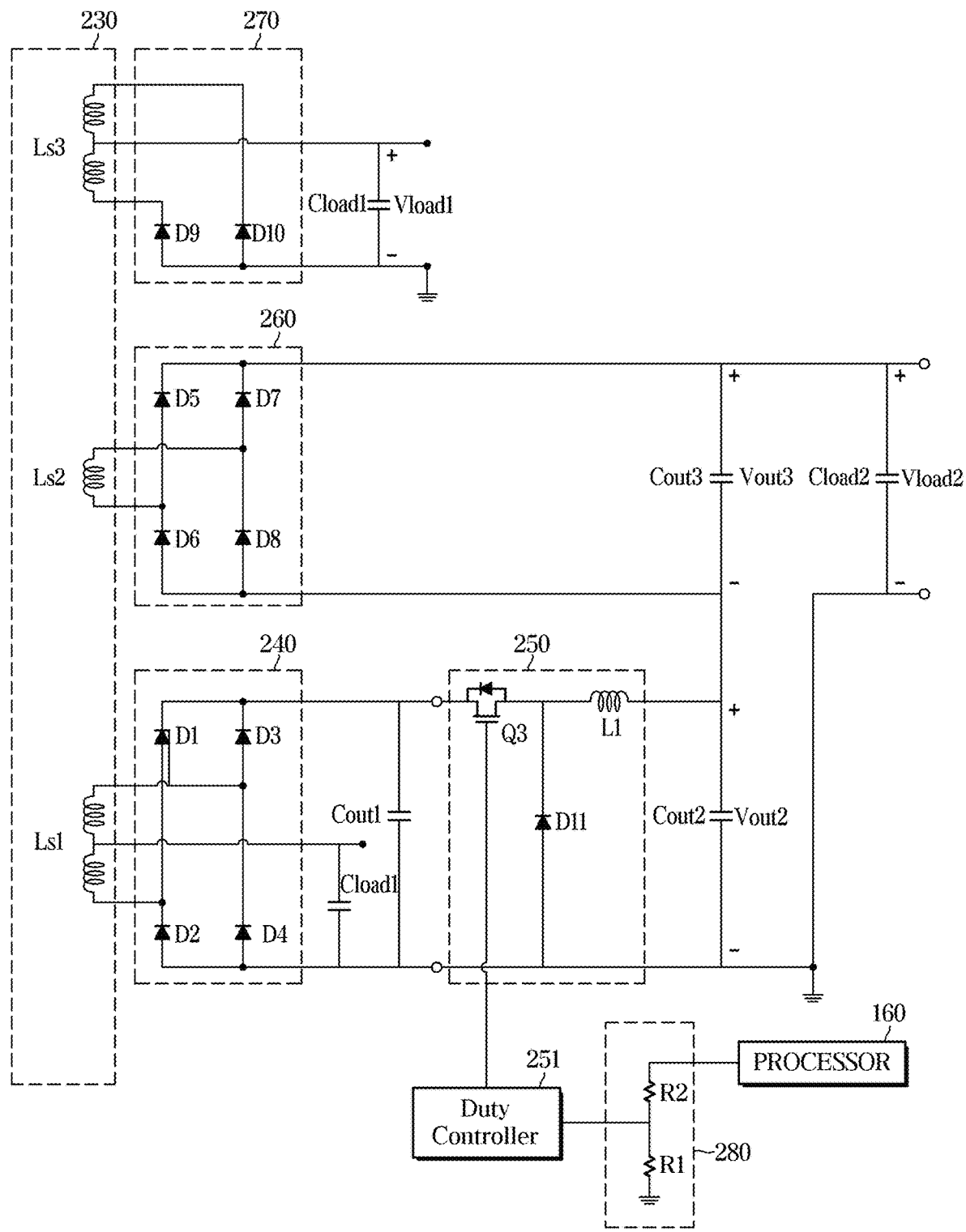
FIG. 6 illustrates a secondary side circuit of a power circuit included in a display apparatus, according to an embodiment of the disclosure.

FIG. 6 illustrates a secondary side circuit of a power circuit included in a display apparatus, according to an embodiment of the disclosure. More specifically, FIG. 6 illustrates a circuit configuration of the first rectifier 240, the DC-DC converter 250, the second rectifier 260, and the third rectifier 270.

One or more components shown in FIG. 6 may be omitted.

The first rectifier 240 may include a diode bridge configured with, for example, four diodes D1, D2, D3, and D4. The diode bridge may apply a positive component of an alternating current voltage applied to the first coil Ls1 to a positive line, and a negative component of the alternating current voltage to a negative line.

Both terminals of the diode bridge configured with the diodes D1, D2, D3, and D4 may be connected with both terminals of the first output capacitor Cout1. Accordingly, the first rectifier 240 may operate as a full bridge rectifier with respect to the first output capacitor Cout1, and the first rectifier 240 may output a rectified voltage corresponding to the number of turns of the first coil Ls1 to the first output capacitor Cout1.

The first coil Ls1 may include a center tap. The center tap of the first coil Ls1 and a cathode of the diode bridge may be connected with both terminals of the first load capacitor Cload1. Accordingly, the first rectifier 240 may operate as a center tap rectifier with respect to the first load capacitor Cload1, and the first rectifier 240 may output a rectified voltage corresponding to half of the number of turns of the first coil Ls1 to the first load capacitor Cload1.

The first load capacitor Cload1 may output a first load voltage Vload1 corresponding to half of the number of turns of the first coil Ls1.

The DC-DC converter 250 may include a buck converter including, for example, a switch Q3, a diode D11, and an inductor L1. The buck converter may lower a first output voltage Vout1 output from the first output capacitor Cout1 to a second output voltage Vout2 by switching of the switch Q3. Also, the buck converter may output the second output voltage Vout2 to the second output capacitor Cout2. At this time, a magnitude of the second output voltage Vout2 may depend on a duty cycle of the switch Q3.

The buck converter may further include a duty controller 251 for controlling the duty cycle of the switch Q3. The duty controller 251 may receive a duty control signal Vduty from the processor 160. The duty controller 251 may control the duty cycle of the switch Q3 based on the duty control signal Vduty.

The duty controller 251 may be connected with the processor 160 through a voltage divider 280 including a resistor R1 and a resistor R2.

The processor 160 may output a voltage signal corresponding to brightness of an image to the voltage divider 280. For example, the processor 160 may output a voltage signal of 0 V at lowest brightness of an image, and a voltage signal of 3 V at highest brightness of an image.

The duty controller 251 may receive a voltage of a node at which the resistor R1 and the resistor R2 of the voltage divider 280 are connected with each other. In other words, the duty controller 251 may receive a voltage signal (duty control signal) divided by the voltage divider 280.

The duty controller 251 may control a duty cycle of the switch Q3 based on the duty control signal Vduty. For example, the duty controller 251 may increase a duty cycle of the switch Q3 based on an identification that the duty control signal Vduty represents a brightness increase. Also, the duty controller 251 may decrease a duty cycle of the switch Q3 based on an identification that the duty control signal Vduty represents a brightness decrease.

The second rectifier 260 may include a diode bridge configured with, for example, four diodes D5, D6, D7, and D8. The diode bridge may apply a positive component of an alternating current voltage applied to the second coil Ls2 to a positive line and a negative component of the alternating current voltage to a negative line.

Both terminals of the diode bridge configured with the diodes D5, D6, D7, and D8 may be connected with both terminals of the third output capacitor Cout3. The second rectifier 260 may operate as a full bridge rectifier, and output a rectified voltage corresponding to the number of turns of the second coil Ls2 to the third output capacitor Cout3.

The third output capacitor Cout3 may be connected in series with the second output capacitor Cout2. A second load capacitor Cload2 may be provided between both terminals of the third output capacitor Cout3 and the second output capacitor Cout2.

The second load capacitor Cload2 may output a second load voltage Vload2 corresponding to a sum of the third output voltage Vout3 corresponding to the number of turns of the second coil Ls2 and the second output voltage Vout2 converted by the DC-DC converter 250.

The third rectifier 270 may include, for example, a diode D9 and a diode D10. The third coil Ls3 may include a center tap. The center tap of the third coil Ls3 and cathodes of the diodes D9 and D10 may be respectively connected with both terminals of the third load capacitor Cload3.

The third rectifier 270 may operate as a center tap rectifier, and output a rectified voltage corresponding to half of the number of turns of the third coil Ls3 to the third load capacitor Cload3.

The third load capacitor Cload3 may output the third load voltage Vload3 corresponding to half of the number of turns of the third coil Ls3.

FIG. 7 illustrates changes of a driving voltage that is supplied to a display of a display apparatus, according to an embodiment of the disclosure.

As shown in FIG. 7, the power circuit 130 may apply the second load voltage Vload2 to the display 150.

The second load voltage Vload2 may be a sum of the third output voltage Vout3 corresponding to the number of turns of the second coil Ls2 and the second output voltage Vout2 converted by the DC-DC converter 250.

The processor 160 may change the second output voltage Vout2, as well as the third output voltage Vout3.

For example, the processor 160 may control an output of the DC-AC converter 220 included in a primary side of the power circuit 130. The processor 160 may transfer a control signal for increasing or decreasing the third load voltage Vload3 to the inverter controller 223 of the DC-AC converter 220. The inverter controller 223 may control power that is to be transferred to the primary coil Lp of the transformer 230, in response to the control signal from the processor 160. A magnitude of the third output voltage Vout3 that is output from the second rectifier 260 may change according to a change of power transferred to the primary coil Lp.

Also, the processor 160 may control the DC-DC converter 250 that outputs the second output voltage Vout2. The processor 160 may output a duty control signal Vduty for controlling the second output voltage Vout2 based on brightness of an image. The duty controller 251 of the DC-DC converter 250 may control a duty cycle of the switching circuit based on the duty control signal Vduty. A magnitude of the second output voltage Vout2 may change according to the duty cycle of the switching circuit.

A change width of the second output voltage Vout2 may be greater than a change width of the third output voltage Vout3.

As shown in (a) of FIG. 7, according to a decrease of brightness of an image that is displayed on the display 150, the second output voltage Vout2 output from the DC-DC converter 250 may decrease, while the third output voltage Vout3 output from the second rectifier 260 may not change. According to the decrease of the second output voltage Vout2, the second load voltage Vload2 may decrease.

As shown in (b) of FIG. 7, according to an increase of brightness of an image that is displayed on the display 150, the second output voltage Vout2 output from the DC-DC converter 250 may increase, while the third output voltage Vout3 output from the second rectifier 260 may not change. According to the increase of the second output voltage Vout2, the second load voltage Vload2 may increase.

As described above, the display apparatus 100 may include a single transformer 230. Nevertheless, the display apparatus 100 may output a plurality of load voltages and change a load voltage by using the DC-DC converter 250.

Figure 8:
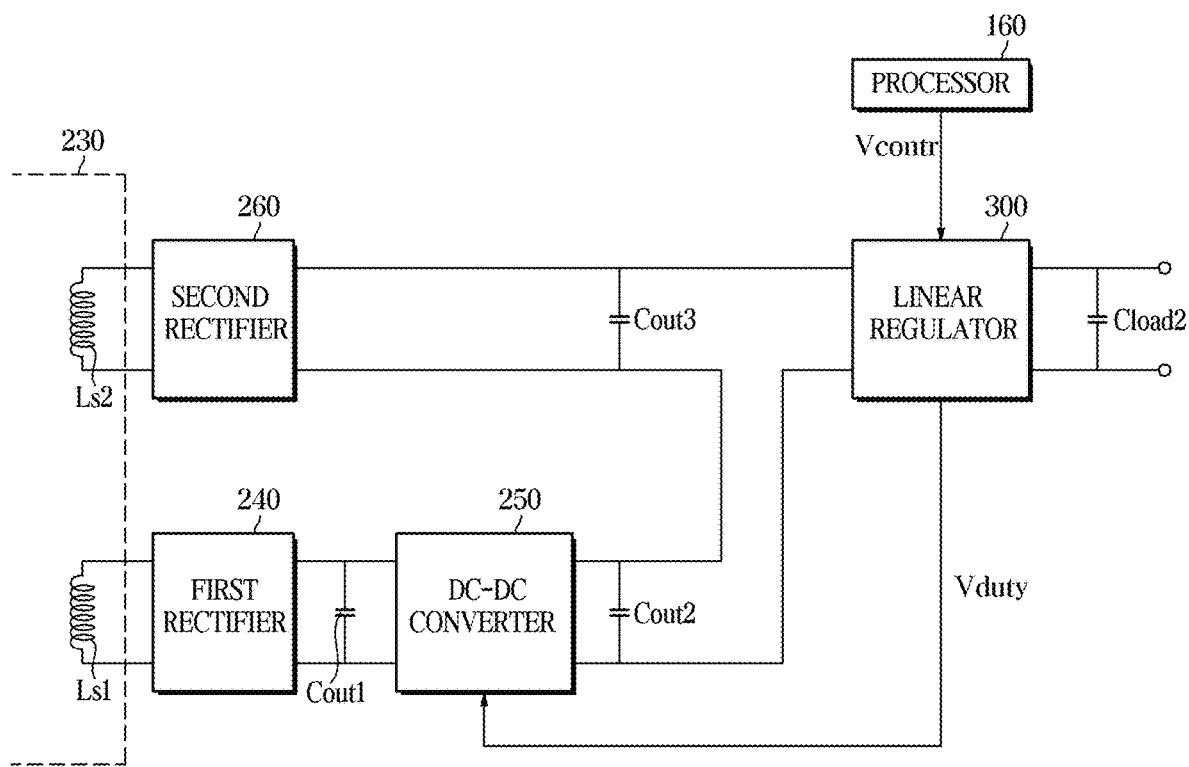
FIG. 8 illustrates an example of a secondary side circuit of a power circuit included in a display apparatus, according to an embodiment of the disclosure.
Figure 9:
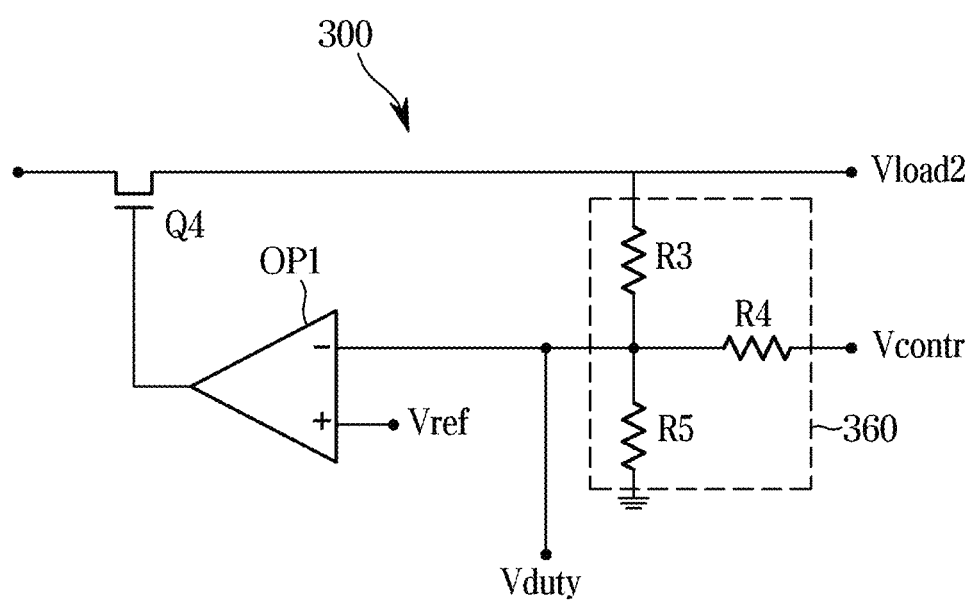
FIG. 9 illustrates an example of a linear regulator included in a display apparatus, according to an embodiment of the disclosure.

FIG. 8 illustrates an example of a secondary side circuit of a power circuit included in a display apparatus, according to an embodiment of the disclosure. FIG. 9 illustrates an example of a variable linear regulator included in a display apparatus, according to an embodiment of the disclosure.

As shown in FIG. 8, the power circuit 130 may include a first rectifier 240, a first output capacitor Cout1, a DC-DC converter 250, a second output capacitor Cout2, a second rectifier 260, a third output capacitor Cout3, and a linear regulator 300.

One or more components shown in FIG. 8 may be omitted.

The first rectifier 240, the DC-DC converter 250, and second rectifier 260 may be the same as the first rectifier, the DC-DC converter, and the second rectifier shown in FIG. 4.

The linear regulator 300 may be provided between the second output capacitor Cout2 or the third output capacitor Cout3 and a second load capacitor Cload2. The linear regulator 300 may receive a sum of a second output voltage Vout2 and a third output voltage Vout3, and output a second load voltage Vload2 to the second load capacitor Cload2.

The linear regulator 300 may limit the second load voltage Vload2 that is output to the second load capacitor Cload2 within a preset range.

The third output voltage Vout2 that is output from the second rectifier 260 may change regardless of an operation of the display 150. For example, the processor 160 may control an output of the DC-AC converter 220 based on a third load voltage Cload3 supplied to the processor 160. The processor 160 may increase an output voltage of the DC-AC converter 220 to increase the third load voltage Cload3, and accordingly, the third output voltage Vout3 output from the second rectifier 260 may increase.

As such, the linear regulator 300 may limit an increase of the second load voltage Vload2 by an increase of the third output voltage Vout3, regardless of an operation of the display 150.

The linear regulator 300 may allow an increase of the second load voltage Vload2 to increase brightness of the display 150. In other words, the linear regulator 300 may allow an increase of the second load voltage Vload2 by an increase of the second output voltage Vout2 from the DC-DC converter 250.

The second output voltage Vout2 that is output from the DC-DC converter 250 may change based on brightness of an image that is to be displayed on the display 150. For example, the processor 160 may control an output of the DC-DC converter 250 based on brightness of an image. The processor 160 may control the DC-DC converter 250 to increase the second output voltage Vout2 to increase brightness of an image.

As such, the linear regulator 300 may allow an increase of the second load voltage Vload2 by an increase of the second output voltage Vout2.

As shown in FIG. 9, the linear regulator 300 may include a switch Q4, an amplifier OP1, and a voltage overlapping circuit 360.

One or more components shown in FIG. 9 may be omitted.

The switch Q4 may be provided between a positive terminal of the third output capacitor Cout3 and a positive terminal of the second load capacitor Cload2. The switch Q4 may control current that is transferred from the second output capacitor Cout2 or the third output capacitor Cout3 to the second load capacitor Cload2.

The voltage overlapping circuit 360 may overlap the second load voltage Vload2 of the second load capacitor Cload2 with a brightness control signal Vcontr output from the processor 160 at a preset ratio. Also, the voltage overlapping circuit 360 may output an output voltage resulting from overlapping the second load voltage Vload2 with the brightness control signal Vcontr at the preset ratio. The voltage overlapping circuit 360 may divide the second load voltage Vload2, and divide the brightness control signal Vcontr. Also, the voltage overlapping circuit 360 may overlap the divided second load voltage Vload2 with the divided brightness control signal Vcontr.

For example, the second load voltage Vload2 may be applied to a resistor R3 and a resistor R5 that are connected in series with each other. Accordingly, the second load voltage Vload2 may be divided at a preset ratio by the resistors R3 and R5. Also, the brightness control signal Vcontr may be applied to a resistor R4 and the resistor R5 that are connected in series with each other. The brightness control signal Vcontr may be divided at a preset ratio by the resistors R4 and R5.

A voltage resulting from overlapping the second load voltage Vload2 divided at the preset ratio with the brightness control signal Vcontr divided at the preset ratio may be applied to the resistor R5.

As such, the voltage overlapping circuit 360 may output an output voltage resulting from overlapping the second load voltage Vload2 with the brightness control signal Vcontr at the preset ratio.

According to an increase of the second load voltage Vload2, an output voltage of the voltage overlapping circuit 360 may increase at the preset ratio. Also, according to an increase of the brightness control signal Vcontr, an output voltage of the voltage overlapping circuit 360 may increase at the preset ratio.

An output voltage of the voltage overlapping circuit 360 may be provided as a duty control signal Vduty to the DC-DC converter 250. Accordingly, the DC-DC converter 250 may control the second output voltage Vout2 based on the second load voltage Vload2 and the brightness control signal Vcontr for brightness control.

The amplifier OP1 may compare the output voltage of the voltage overlapping circuit 360 with a reference voltage Vref, and control the switch Q4 based on the comparison between the output voltage of the voltage overlapping circuit 360 and the reference voltage Vref.

For example, the amplifier OP1 may output a control signal for turning on the switch Q4 based on an identification that the output voltage of the voltage overlapping circuit 360 is smaller than the reference voltage Vref. Also, the amplifier OP1 may output a control signal for turning off the switch Q4 based on an identification that the output voltage of the voltage overlapping circuit 360 is greater than the reference voltage Vref.

An output from the amplifier OP1 may change based on a change of the second load voltage Vload2.

For example, according to an increase of the second load voltage Vload2 while the amplifier OP1 outputs a control signal for turning on the switch Q4, an output voltage of the voltage overlapping circuit 360 may increase. The increased output voltage of the voltage overlapping circuit 360 may become greater than the reference voltage Vref. In this case, the amplifier OP1 may output a control signal for turning off the switch Q4. Due to the turning-off of the switch Q4, the second load voltage Vload2 may decrease.

Also, according to an increase of the second load voltage Vload2, the duty control signal Vduty may increase. The DC-DC converter 250 may decrease a duty cycle of the switch Q3 based on the increased duty control signal Vduty. Accordingly, the second output voltage Vout2 may decrease, and the second load voltage Vout2 may decrease.

According to a decrease of the second load voltage Vload2 while the amplifier OP1 outputs a control signal for turning off the switch Q4, an output voltage of the voltage overlapping circuit 360 may decrease. The decreased output voltage of the voltage overlapping circuit 360 may become smaller than the reference voltage Vref. In this case, the amplifier OP1 may output a control signal for turning on the switch Q4. Due to the turning-on of the switch Q4, the second load voltage Vload2 may increase.

Also, according to a decrease of the second load voltage Vload2, the duty control signal Vduty may decrease. The DC-DC converter 250 may increase a duty cycle of the switch Q3 based on the decreased duty control signal Vduty. Accordingly, the second output voltage Vout2 may increase, and the second load voltage Vout2 may increase.

Accordingly, the linear regulator 300 may limit the second load voltage Vload2 within a preset range.

An output of the amplifier OP1 may change based on a change of the brightness control voltage Vcontr.

According to an increase of the brightness control signal Vcontr while the amplifier OP1 outputs a control signal for turning on the switch Q4, an output voltage of the voltage overlapping circuit 360 may increase. The increased output voltage of the voltage overlapping circuit 360 may become greater than the reference voltage Vref. In this case, the amplifier OP1 may output a control signal for turning off the switch Q4. Due to the turning-off of the switch Q4, the second load voltage Vload2 may decrease.

Also, according to an increase of the brightness control signal Vcontr, the duty control signal Vduty may increase. The DC-DC converter 250 may decrease a duty cycle of the switch Q3 based on the increased duty control signal Vduty. Accordingly, the second output voltage Vout2 may decrease, and the second load voltage Vout2 may decrease.

According to a decrease of the brightness control signal Vcontr while the amplifier OP1 outputs a control signal for turning off the switch Q4, an output voltage of the voltage overlapping circuit 360 may decrease. The decreased output voltage of the voltage overlapping circuit 360 may become smaller than the reference voltage Vref. In this case, the amplifier OP1 may output a control signal for turning on the switch Q4. Due to the turning-on of the switch Q4, the second load voltage Vload2 may increase.

According to a decrease of the brightness control signal Vcontr, the duty control signal Vduty may decrease. The DC-DC converter 250 may increase a duty cycle of the switch Q3 based on the decreased duty control signal Vduty. Accordingly, the second output voltage Vout2 may increase, and the second load voltage Vout22 may increase.

As such, according to an increase of the brightness control signal Vcontr, the second load voltage Vload2 may decrease. Also, according to a decrease of the brightness control signal Vcontr, the second load voltage Vload2 may increase.

Accordingly, the processor 160 may decrease the brightness control signal Vcontr to increase brightness of the display 150, and may increase the brightness control signal Vcontr to decrease brightness of the display 150.

Figure 10:
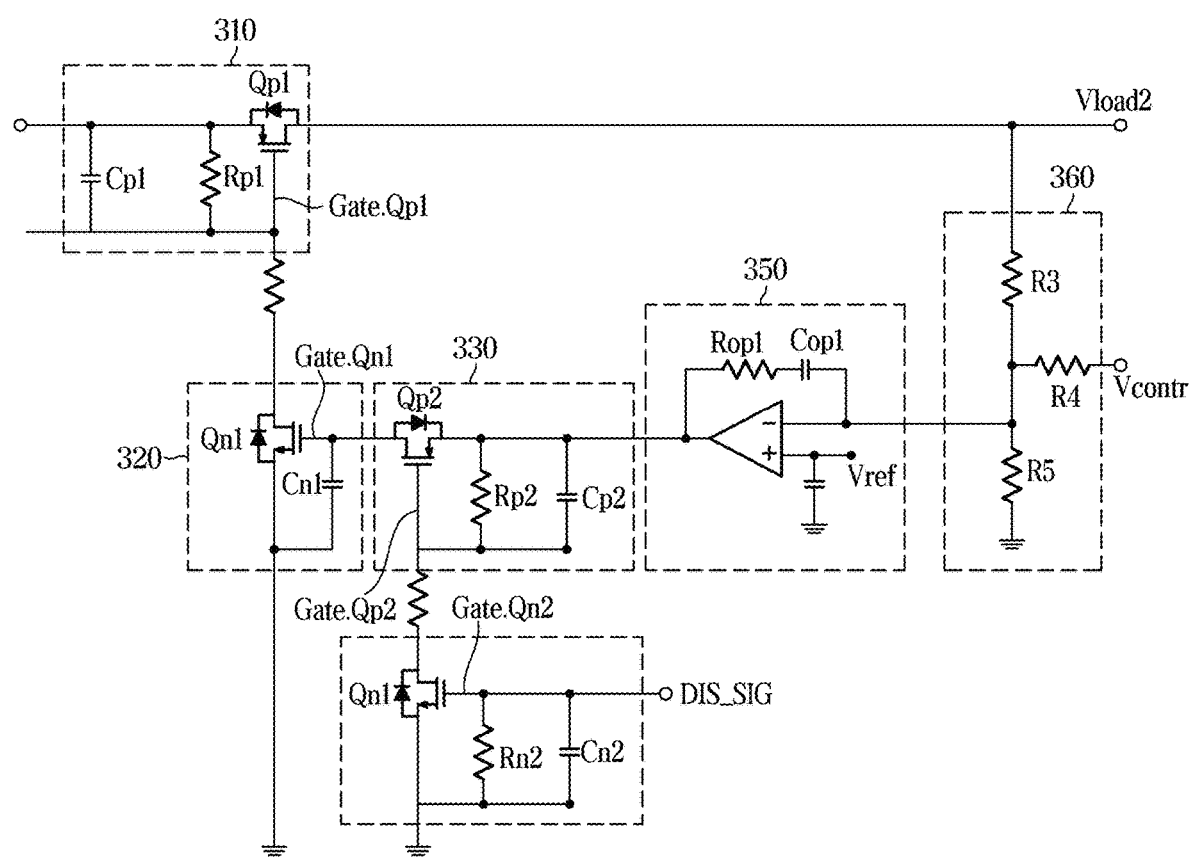
FIG. 10 illustrates an example of a linear regulator included in a display apparatus, according to an embodiment of the disclosure.

FIG. 10 illustrates an example of a linear regulator included in a display apparatus, according to an embodiment of the disclosure.

The power circuit 130 of the display apparatus 100 may include the linear regulator 300, for example, as shown in FIG. 10.

The linear regulator 300 may limit the second load voltage Vload2 of the second load capacitor Cload2 within a preset range.

Also, the linear regulator 300 may block power to be supplied to the display panel 152 upon turning-off of the display panel 152, and change the second load voltage Vload2 of the second load capacitor Cload2 to "0" V. Accordingly, the linear regulator 300 may block, upon turning-off of the display panel 152, microcurrent from flowing to the display panel 152 and prevent the display panel 152 from emitting micro light.

The linear regulator 300 may include a first switch circuit 310 including a first PMOS switch Qp1, a second switch circuit 320 including a first NMOS switch Qn1, a third switch circuit 330 including a second PMOS switch Qp2, a fourth switch circuit 340 including a second NMOS switch Qn2, a voltage overlapping circuit 360 including resistors R3, R4, and R5, and an amplifier circuit 350 including an amplifier OP1.

One or more components shown in FIG. 10 may be omitted.

The first switch circuit 310 may be provided between the positive terminal of the third output capacitor Cout3 and the positive terminal of the second load capacitor Cload2. The first switch circuit 310 may control current that is transferred from the second output capacitor Cout2 or the third output capacitor Cout3 to the second load capacitor Cload2, according to a control signal input to a control terminal Gate.Qp1.

The first switch circuit 310 may include the first PMOS switch Qp1 provided between the positive terminal of the third output capacitor Cout3 and the positive terminal of the second load capacitor Cload2, a capacitor Cp1 for stabilizing an input voltage of the first PMOS switch Qp1, and a resistor Rp1 for discharging the capacitor Cp1 upon turning-off of the first PMOS switch Qp1.

The second switch circuit 320 may be provided between the control terminal Gate.Qp1 of the first switch circuit 310 and the ground of the display apparatus 100. The second switch circuit 320 may output a control signal for turning on or off the first switch circuit 310 according to a control signal input to a control terminal Gate.Qn1.

The second switch circuit 320 may include a first NMOS switch Qn1 provided between the control terminal Gate.Qp1 of the first switch circuit 310 and the ground of the display apparatus 100, and a capacitor Cn1 for stabilizing an input voltage of the first NMOS switch Qn1.

The third switch circuit 330 may be provided between the control terminal Gate.Qn1 of the second switch circuit 320 and an output terminal of the amplifier circuit 350. The third switch circuit 330 may output a control signal for turning on or off the second switch circuit 320 according to a control signal input to a control terminal Gate.Qp2.

The third switch circuit 330 may include a second PMOS switch Qp2 provided between the control terminal Gate.Qn1 of the second switch circuit 320 and the output terminal of the amplifier circuit 350, a capacitor Cp2 for stabilizing an input voltage of the second PMOS switch Qp2, and a resistor Rp2 for discharging the capacitor Cp2 upon turning-off of the second PMOS switch Qp2.

The fourth switch circuit 340 may be provided between the control terminal Gate.Qp2 of the third switch circuit 330 and the ground of the display apparatus 100. The fourth switch circuit 340 may output a control signal for turning on or off the third switch circuit 330 according to a control signal input to the control terminal Gate.Qp2.

The fourth switch circuit 340 may include a second NMOS switch Qn2 provided between the control terminal Gate. Qp2 of the third switch circuit 330 and the ground of the display apparatus 100, a capacitor Cn2 for stabilizing an input voltage of the second NMOS switch Qn2, and a resistor Rn2 for discharging the capacitor Cn2 upon turning-off of the second NMOS switch Qn2.

The voltage overlapping circuit 360 may be the same as the voltage overlapping circuit 360 shown in FIG. 9.

The voltage overlapping circuit 360 may overlap a second load voltage Vload2 of the second load capacitor Cload2 with a brightness control signal Vcontr output from the processor 160 at a preset ratio, and output an overlapping output voltage. The voltage overlapping circuit 360 may include resistors R3 and R5 for dividing the second load voltage Vload2, and resistors R4 and R5 for dividing the brightness control signal Vcontr.

The amplifier circuit 350 may be provided between the voltage overlapping circuit 360 and the third switch circuit 330, and receive an output signal of the voltage overlapping circuit 360, and output a control signal to the third switch circuit 330.

The amplifier circuit 350 may include an amplifier OP1 for comparing an output voltage of the voltage overlapping circuit 360 with a reference voltage Vref, and a resistor Rop1 or a capacitor Cop1 for stabilizing an output of the amplifier OP1.

The amplifier circuit 350 may compare an output voltage of the voltage overlapping circuit 360 with the reference voltage Vref, and output a control signal for controlling the second switch circuit 320 and the first switch circuit 310 to the third switch circuit 330, based on the comparison between the output voltage of the voltage overlapping circuit 360 and the reference voltage Vref.

While the third switch circuit 330 is turned on by the fourth switch circuit 340, an output of the amplifier circuit 350 may be transferred to the second switch 320 via the third switch circuit 330. The second switch circuit 320 may be turned on or off according to an output of the amplifier circuit 350, and the first switch circuit 310 may be turned on or off according to the turning-on/off of the second switch circuit 320.

As such, the amplifier circuit 350 may turn on or off the first switch circuit 310 based on a comparison between the output voltage of the voltage overlapping circuit 360 and the reference voltage Vref, while the third switch circuit 330 is turned on by the fourth switch circuit 340.

Upon turning-off of the third switch circuit 330 by the fourth switch circuit 340, both the second switch circuit 320 and the first switch circuit 310 may be turned off.

The fourth switch circuit 340 may receive a display signal DIS_ON for turning on or off the display panel 152 from the processor 160.

In an "off state" of the display apparatus 100 in which the plug is not inserted in the power socket, an off signal may be input to the control terminal Gate.Qn2 of the fourth switch circuit 340.

In a "standby state" of the display apparatus 100 in which the plug is inserted in the power socket and a power supply command (operation command) is not received from a user, the processor 160 may output a display signal DIS_SIG for turning off the display panel 152 to the control terminal Gate.Qn2 of the fourth switch circuit 340 to block power from being supplied to the display panel 152.

The fourth switch circuit 340 may be turned off by the display signal DIS_SIG of the processor 160. According to the turning-off of the fourth switch circuit 340, the third switch circuit 330 may be turned off, and according to the turning-off of the third switch circuit 330, the second switch circuit 320 may be turned off. Also, according to the turning-off of the second switch circuit 320, the first switch circuit 310 may be turned off, and "0" V may be output to the second load capacitor Cload2.

Accordingly, the power circuit 130 may supply no power to the display 150.

In an "on state" of the display apparatus 100 in which the plug is inserted in the power socket and a power supply command (or an operation command) is received from a user, the processor 160 may output a display signal DIS_SIG for turning on the display panel 152 to the control terminal Gate.Qn2 of the fourth switch circuit 340 to supply power to the display panel 152.

The fourth switch circuit 340 may be turned on by the display signal DIS_SIG of the processor 160. According to the turning-on of the fourth switch circuit 340, the third switch circuit 330 may be turned on. The third switch circuit 330 may transfer an output signal of the amplifier circuit 350 to the second switch circuit 320. The second switch circuit 320 and the first switch circuit 310 may be turned on according to an output signal of the amplifier circuit 350.

Accordingly, the power circuit 130 may apply the second load voltage Vload2 to the display 150, and supply power to the display 150.

Figure 11:
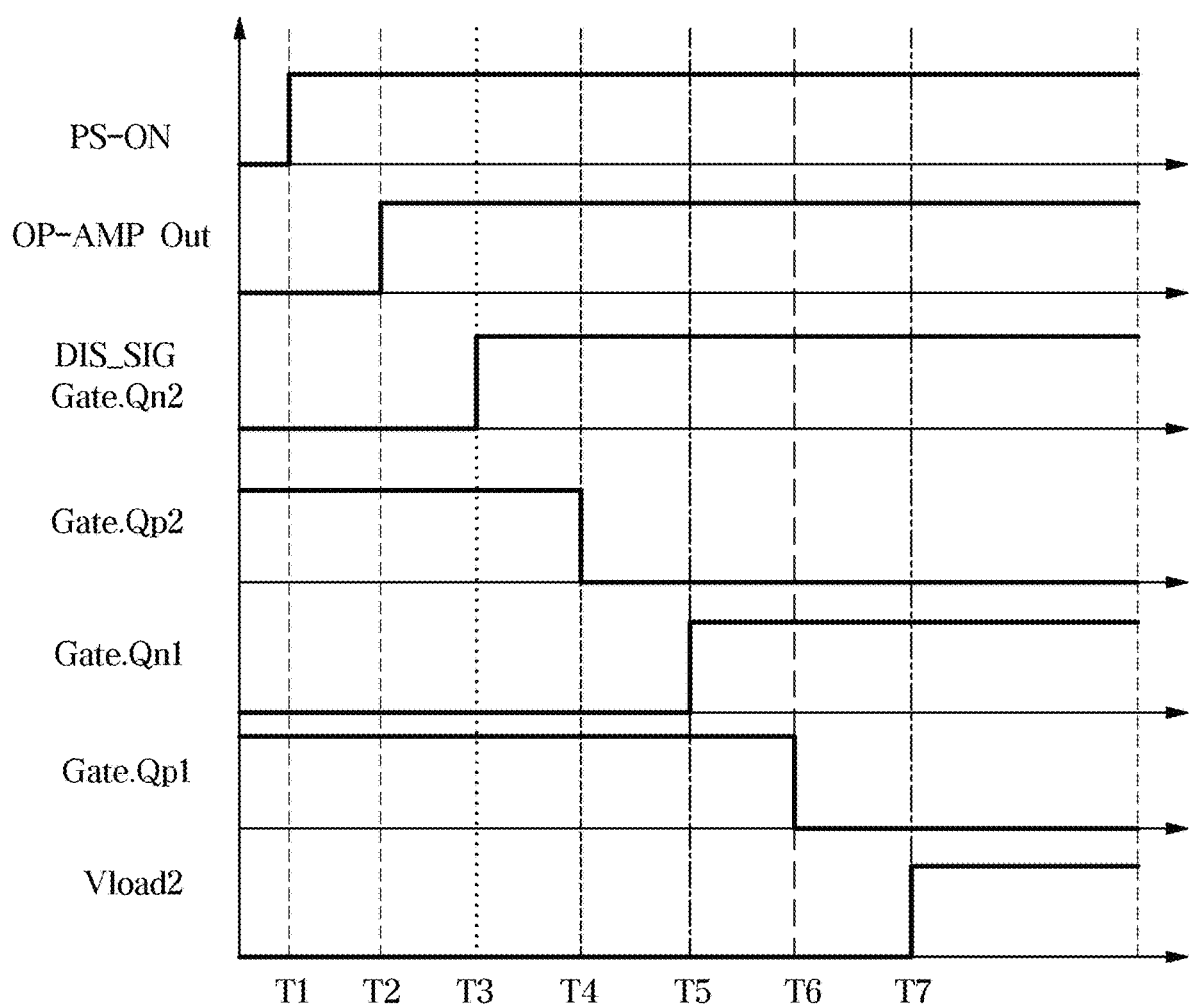
FIG. 11 illustrates an example of an operation sequence by the linear regulator shown in FIG. 10, according to an embodiment of the disclosure.

FIG. 11 illustrates an example of an operation sequence by the linear regulator shown in FIG. 10.

As shown in FIG. 11, the processor 160 may receive a signal PS_ON for turning on the display apparatus 100 through the user inputter 110 at a time T1.

The processor 160 may output a brightness control signal Vcontr in response to the signal PS_ON. Also, by the signal PS_ON, power may be supplied to the amplifier OP1 of the amplifier circuit 350.

The voltage overlapping circuit 360 may overlap a second load voltage Vload2 with the brightness control signal Vcontr.

The amplifier circuit 350 may compare an output voltage of the voltage overlapping circuit 360 with a reference voltage Vref, and output a signal corresponding to a result of the comparison at a time T2. For example, according to an identification that the output voltage of the voltage overlapping circuit 360 is smaller than the reference voltage Vref, the amplifier circuit 350 may output a high signal. The high signal of the amplifier circuit 350 may be input to an input terminal of the third switch circuit 330.

Also, the processor 160 may output a display signal DIS_SIG for supplying power to the display panel 152 at a time T3 in response to the signal PS_ON.

The display signal DIS_SIG may be input to the control terminal Gate.Qn2 of the second NMOS switch Qn2 of the fourth switch circuit 340 at the time T3, and the fourth switch circuit 340 may be turned on.

According to the turning-on of the fourth switch circuit 340, the control terminal Gate. Qp2 of the second PMOS switch Qn2 of the third switch circuit 330 may be connected with the ground of the display apparatus 100. Accordingly, a low signal may be input to the control terminal Gate. Qp2 of the second PMOS switch Qp2 of the third switch circuit 330 at a time T4. The third switch circuit 330 may be turned on by the low signal of the control terminal Gate.Qp2.

According to the turning-on of the third switch circuit 330, the control terminal Gate.Qn1 of the first NMOS switch Qn1 of the second switch circuit 320 may be connected with the output terminal of the amplifier circuit 350. Accordingly, a high signal may be input to the control terminal Gate.Qn1 of the first NMOS switch Qn1 of the second switch circuit 320 at a time T5. The second switch circuit 320 may be turned on by the high signal of the control terminal Gate.Qn1.

According to the turning-on of the second switch circuit 320, the control terminal Gate.Qp1 of the first PMOS switch Qp1 of the first switch circuit 310 may be connected with the ground of the display apparatus 100. Accordingly, a low signal may be input to the control terminal Gate.Qp1 of the first PMOS switch Qp1 of the first switch circuit 310, at a time T6. The first switch circuit 310 may be turned on by the low signal of the control terminal Gate.Qp1.

According to the turning-on of the first switch circuit 310, a voltage for driving the display 150 may be applied to the second load capacitor Cload2. Also, the second load capacitor Cload2 may output the second load voltage Vload2.

Figure 12:
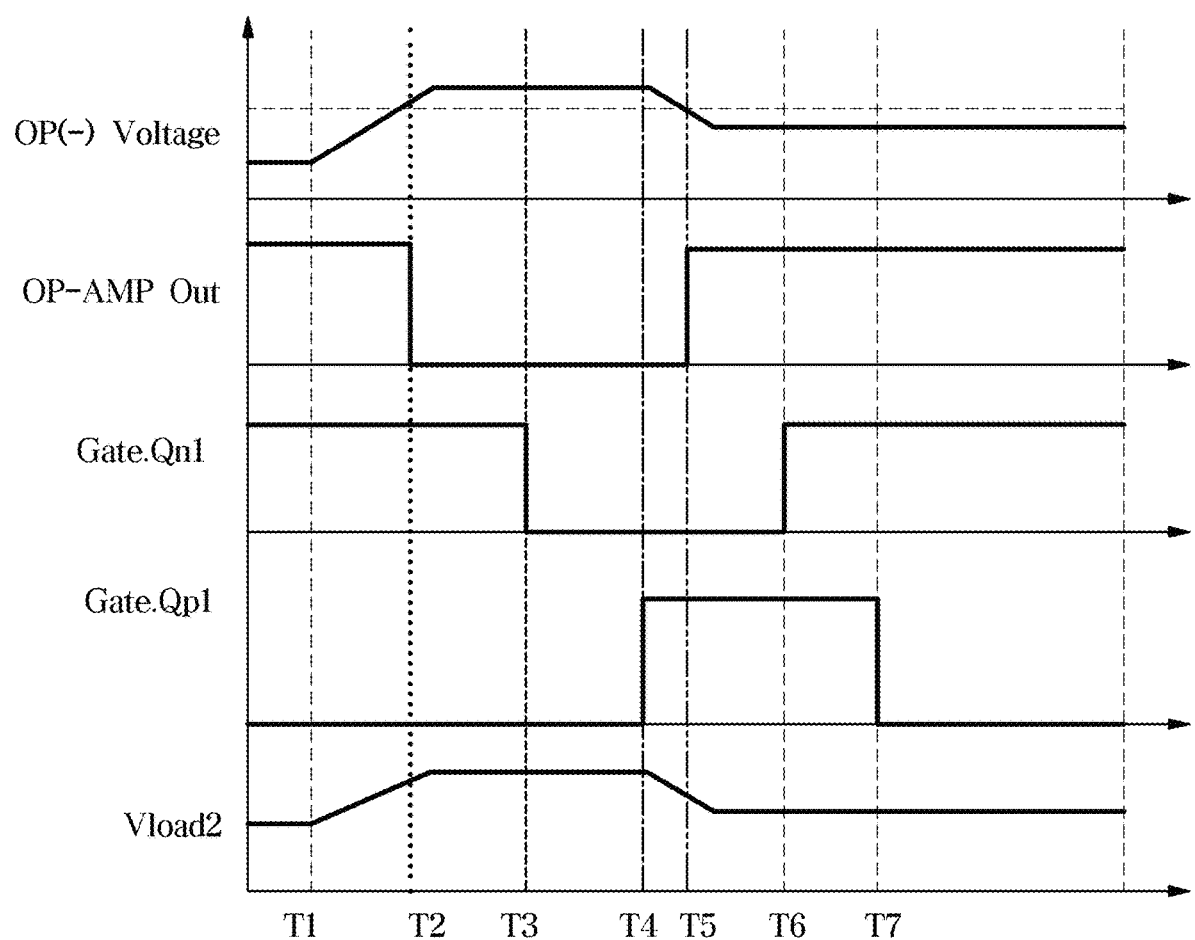
FIG. 12 illustrates an example of cross regulation of the linear regulator shown in FIG. 10, according to an embodiment of the disclosure.

FIG. 12 illustrates an example of cross regulation of the linear regulator shown in FIG. 10.

As shown in FIG. 12, the voltage overlapping circuit 360 may output a voltage that is smaller than a reference voltage Vref. Accordingly, the amplifier circuit 350 may output a high signal, and the second switch circuit 320 and the first switch circuit 310 may be turned on. A second load voltage Vload2 may be output.

At a time T1, the processor 160 may control the inverter controller 223 of the DC-AC converter 220 to increase a third load voltage Vload3.

According to the control by the processor 160, the third load voltage Vload3 may increase, and the second load voltage Vload2 may increase accordingly. Also, according to the increase of the second load voltage Vload2, an output voltage of the voltage overlapping circuit 360 may also increase.

The increased output voltage of the voltage overlapping circuit 360 may be greater than the reference voltage Vref at a time T2. Accordingly, the amplifier circuit 350 may output a low signal at the time T2.

Because the amplifier circuit 350 outputs the low signal, the low signal may be input to the control terminal Gate. Qn1 of the first NMOS switch Qn1 of the second switch circuit 320 at a time T3, and the second switch circuit 320 may be turned off.

According to the turning-off of the second switch circuit 320, a high signal may be input to the control terminal Gate. Qp1 of the first PMOS switch Qp1 of the first switch circuit 310, at a time T4, and the first switch circuit 310 may be turned off.

According to the turning-off of the first switch circuit 310, the second load voltage Vload2 of the second load capacitor Cload2 may decrease. Also, according to the decrease of the second load voltage Vlad2, an output voltage of the voltage overlapping circuit 360 may also decrease.

The decreased output voltage of the voltage overlapping circuit 360 may be smaller than the reference voltage Vref at a time T5. Accordingly, the amplifier circuit 350 may output a high signal at the time T5.

Because the amplifier circuit 350 outputs the high signal, the high signal may be input to the control terminal Gate. Qn1 of the first NMOS switch Qn1 of the second switch circuit 320 at a time T6, and the second switch circuit 320 may be turned on.

According to the turning-on of the second switch circuit 320, a low signal may be input to the control terminal Gate. Qp1 of the first PMOS switch Qp1 of the first switch circuit 310 at a time T7, and the first switch circuit 310 may be turned on.

According to the turning-on of the first switch circuit 310, the second load voltage Vload2 of the second load capacitor Cload2 may increase. Also, according to the increase of the second load voltage Vload2, an output voltage of the voltage overlapping circuit 360 may also decrease.

As such, in a case in which the second load voltage Vload2 increases together with the third load voltage Vload3 according to a control by the processor 160, the linear regulator 300 may limit the increase of the third load voltage Vload3 within a preset range.

Figure 13:
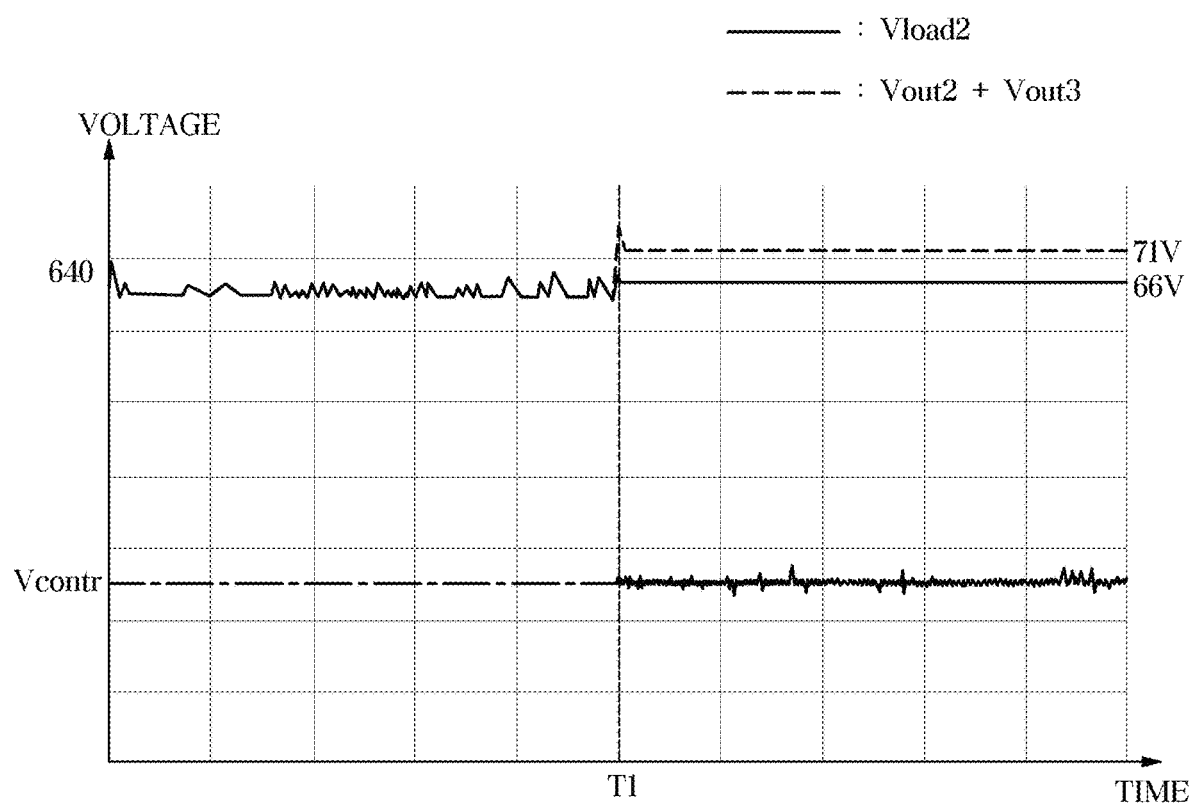
FIG. 13 illustrates an example of an actual measurement on cross regulation of a power circuit included in a display apparatus, according to an embodiment of the disclosure.

FIG. 13 illustrates an example of an actual measurement on cross regulation of a power circuit included in a display apparatus, according to an embodiment of the disclosure.

In FIG. 13, a solid line may represent a second load voltage Vload2 output from the second load capacitor Cload2, and a dotted line may represent a sum of a second output voltage Vout2 and a third output voltage Vout3, respectively output from the second output capacitor Cout2 and the third output capacitor Cout3. In other words, the dotted line may represent an input voltage of the linear regulator 300, and the solid line may represent an output voltage of the linear regulator 300.

As shown in FIG. 13, the processor 160 may output a constant brightness control signal Vcontr. The processor 160 may control the inverter controller 223 of the DC-AC converter 220 to increase the third load voltage Vload3 at a time T1.

The sum of the second output voltage Vout2 and the third output voltage Vout3 may increase from 64 V to 71 V at the time T1. Meanwhile, the second load voltage Vload2 may increase from 64 V to 66 V at the time T1. In other words, the linear regulator 300 may limit an output voltage to 66 V.

As such, the linear regulator 300 may limit the second load voltage Vload2 within a preset range. Also, the linear regulator 300 may satisfy cross regulation.

Figure 14:
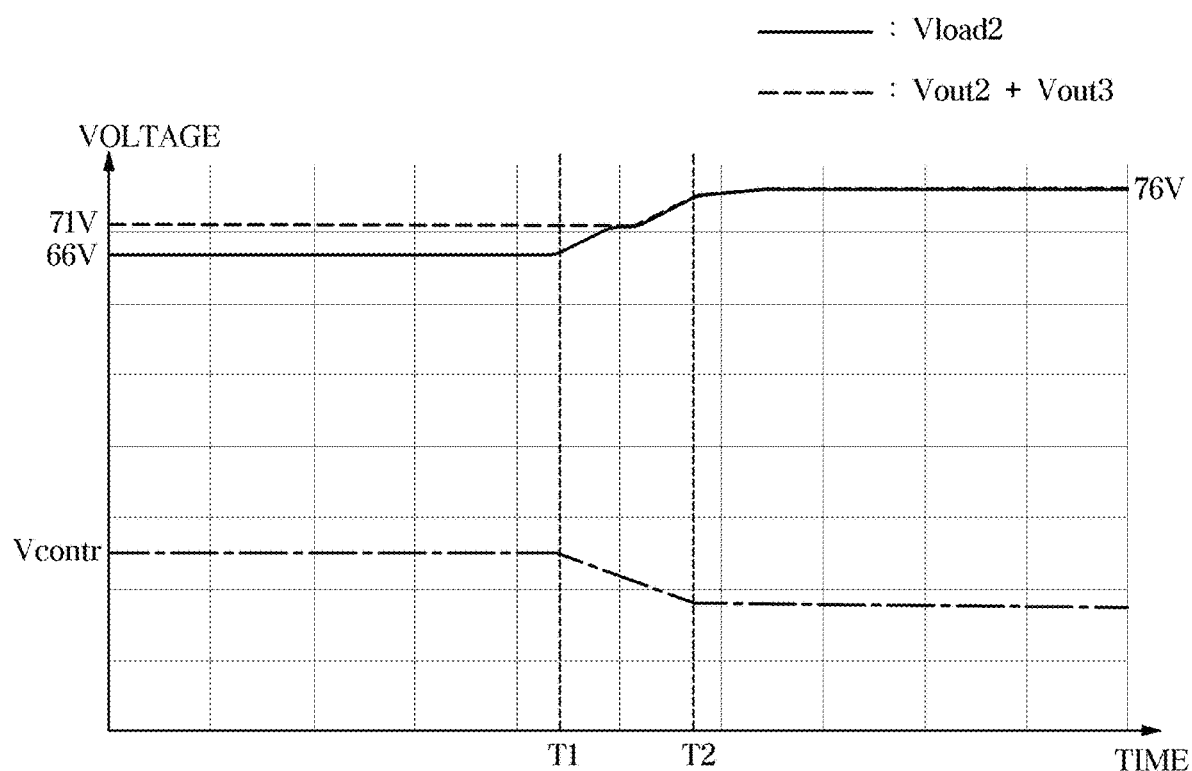
FIG. 14 illustrates an example of an actual measurement on outputs from a power circuit by a brightness control of a display apparatus, according to an embodiment of the disclosure.

FIG. 14 illustrates an example of an actual measurement on outputs from a power circuit by a brightness control of a display apparatus, according to an embodiment of the disclosure.

In FIG. 14, a solid line may represent a second load voltage Vload2 output from the second load capacitor Cload2, and a dotted line may represent a sum of a second output voltage Vout2 and a third output voltage Vout3 respectively output from the second output capacitor Cout2 and the third output capacitor Cout3. In other words, the dotted line may represent an input voltage of the linear regulator 300, and the solid line may represent an output voltage of the linear regulator 300.

As shown in FIG. 14, the processor 160 may output a constant brightness control signal Vcontr until a time T1. An input voltage of 71 V may be input to the linear regulator 300, and an output voltage of 66V may be output from the linear regulator 300, until the time T1. As such, the linear regulator 300 may limit an output voltage to 66 V.

Between the time T1 and a time T2, the processor 160 may decrease the brightness control signal Vcontr.

According to the decrease of the brightness control signal Vcontr, the linear regulator 300 may increase an output voltage. In other words, the second load voltage Vload2 may increase.

Also, according to the decrease of the brightness control signal Vcontr, a duty control signal Vduty may also decrease. Accordingly, a second output voltage Vout2 output from the DC-DC converter 250 may also increase.

At the time T2, an input voltage of 76 V may be input to the linear regulator 300, and the linear regulator 300 may output an output voltage of 76 V.

As such, a voltage range limited by the linear regulator 300 may change by the brightness control signal Vcontr.

A display apparatus, according to an embodiment of the disclosure may include: a display; a processor configured to process image data to be displayed on the display; a transformer including a primary coil and a plurality of secondary coils; a first rectifier connected with a first coil of the plurality of secondary coils and configured to output a first output voltage corresponding to a number of turns of the first coil; a direct current-direct current (DC-DC) converter configured to receive the first output voltage from the first rectifier and output a second output voltage that is different from the first output voltage; and a second rectifier connected with a second coil of the plurality of secondary coils and configured to output a first load voltage which is a sum of the second output voltage and a third output voltage corresponding to a number of turns of the second coil to the display.

Accordingly, the power circuit may output both a fixed voltage and a variable voltage by using a single transformer.

The processor may control the DC-DC converter to adjust the second output voltage based on brightness of the image data.

Accordingly, the power circuit may change a voltage to be applied to the display according to brightness of an image to be displayed on the display.

The DC-DC converter may adjust the second output voltage based on the first load voltage.

Accordingly, the power circuit may adjust a voltage to be applied to the display within a preset range.

The DC-DC converter may include: a buck converter including a switch, a diode, and an inductor; and a duty controller configured to control a duty cycle of the switch, wherein the duty controller may control the duty cycle of the switch based on the first load voltage and a duty control signal from the processor.

Accordingly, the power circuit may change a voltage to be applied to the display by using the buck converter with a simple configuration.

The duty controller may control the duty cycle of the switch to decrease the second output voltage according to an increase of the first load voltage and increase the second output voltage according to a decrease of the first load voltage.

Accordingly, the power circuit may perform a feedback control of a voltage to be applied to the display.

The duty controller may control the duty cycle of the switch to decrease the second output voltage according to an increase of the duty control signal from the processor and increase the second output voltage according to a decrease of the duty control signal from the processor.

Accordingly, the power circuit may change a voltage to be applied to the display according to brightness of an image to be displayed on the display.

The display apparatus may further include: a first load capacitor configured to output the first load voltage; and a linear regulator provided between the second rectifier and the first load capacitor and configured to limit the first load voltage output from the first load capacitor within a preset range.

Accordingly, the power circuit may limit a voltage to be applied to the display within a preset range.

The linear regulator may include: a load switch provided between the second rectifier and the first load capacitor and configured to control a connection between the second rectifier and the first load capacitor; a voltage overlapping circuit configured to decrease each of the second load voltage and a brightness control signal from the processor at a preset ratio, overlap the second load voltage with the brightness control signal, and output an overlapping voltage; and an amplifier configured to output a voltage control signal for turning on or off the load switch based on a comparison between an output voltage from the voltage overlapping circuit and a preset reference voltage.

Accordingly, the power circuit may limit a voltage to be applied to the display according to the voltage to be applied to the display and brightness of an image to be displayed on the display.

The amplifier may turn off the load switch according to an identification that the output voltage from the voltage overlapping circuit is greater than or equal to the reference voltage, and turn on the load switch according to an identification that the output voltage from the voltage overlapping circuit is smaller than the reference voltage.

Accordingly, the power circuit may limit a voltage to be applied to the display by using a simple circuit including the amplifier.

The processor may control to decrease a voltage of the brightness control signal based on a brightness increase of the image data, and increase a voltage of the brightness control signal based on a brightness decrease of the image data.

Accordingly, the power circuit may limit a voltage to be applied to the display according to brightness of an image to be displayed on the display.

The linear regulator may block a connection between the second rectifier and the first load capacitor in response to a display off signal that is output from the processor.

Accordingly, the power circuit may prevent the display from emitting micro light upon power-off of the display apparatus.

The linear regulator may further include a cutoff switching circuit provided between the load switch and the amplifier, and configured to transfer a voltage control signal from the amplifier to the load switch and turn off the load switch in response to the display off signal from the processor.

Accordingly, the power circuit may prevent microcurrent from being applied to the display apparatus by using a simple circuit.

The linear regulator may change a range of limiting the first load voltage based on the first load voltage and brightness of the image data.

Accordingly, the power circuit may change a range of limiting a voltage to be applied to the display according to a voltage to be applied to the display and brightness of an image to be displayed on the display.

The display apparatus may further include an audio configured to output sound, wherein the first rectifier may be configured to output a second load voltage corresponding to a number of turns of the first coil or half of the number of turns of the first coil to the audio.

Accordingly, the power circuit may supply independent power to the audio.

The display apparatus may further include a third rectifier connected with a third coil of the plurality of secondary coils, and configured to output a third load voltage corresponding to a number of turns of the third coil or half of the number of turns of the third coil to the processor.

Accordingly, the power circuit may supply independent power to the processor.

According to an aspect of the disclosure, a display including a power source capable of stably outputting different voltages and a power supply thereof may be provided.

Meanwhile, the disclosed embodiments may be implemented in the form of a recording medium storing instructions that can be executed by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, a flash memory, an optical data storage, or the like.

The machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least one part of the computer program product (e.g., a downloadable app) may be temporarily generated or at least temporarily stored in the machine-readable storage medium, such as a memory of the manufacturer's server, a server of the application store, or a relay server.

So far, the disclosed embodiments have been described with reference to the accompanying drawings. It will be apparent that those skilled in the art can make various modifications thereto without changing the technical spirit and essential features of the disclosure. Thus, it should be understood that the embodiments described above are merely for illustrative purposes and not for limitation purposes in all aspects.

Although certain embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display;
a processor configured to process image data to be displayed on the display;
a transformer comprising a primary coil and a plurality of secondary coils;
a first rectifier connected directly to a first coil of the plurality of secondary coils, the first rectifier being configured to output a first output voltage corresponding to a number of turns of the first coil;
a direct current-direct current (DC-DC) converter configured to receive the first output voltage directly from the first rectifier and output a second output voltage that is different from the first output voltage; and
a second rectifier connected directly to a second coil of the plurality of secondary coils, the second rectifier being configured to output a first load voltage to the display, wherein the first load voltage is a sum of the second output voltage and a third output voltage corresponding to a number of turns of the second coil.

2. The display apparatus of claim 1, wherein the processor is further configured to control the DC-DC converter to adjust the second output voltage based on a brightness corresponding to the image data.

3. The display apparatus of claim 1, wherein the DC-DC converter is further configured to adjust the second output voltage based on the first load voltage.

4. The display apparatus of claim 1, wherein the DC-DC converter comprises:
a buck converter comprising a switch, a diode, and an inductor; and a duty controller configured to control a duty cycle of the switch based on the first load voltage and a duty control signal from the processor.

5. The display apparatus of claim 4, wherein the duty controller is further configured to control the duty cycle of the switch to decrease the second output voltage according to an increase of the first load voltage, and increase the second output voltage according to a decrease of the first load voltage.

6. The display apparatus of claim 4, wherein the duty controller is further configured to control the duty cycle of the switch to decrease the second output voltage according to an increase of the duty control signal from the processor, and increase the second output voltage according to a decrease of the duty control signal from the processor.

7. The display apparatus of claim 1, further comprising:
a first load capacitor configured to output the first load voltage; and
a linear regulator provided between the second rectifier and the first load capacitor, the linear regulator being configured to limit the first load voltage output from the first load capacitor to a preset range.

8. The display apparatus of claim 7, wherein the linear regulator comprises:
a load switch provided between the second rectifier and the first load capacitor, the load switch being configured to control a connection between the second rectifier and the first load capacitor;
a voltage overlapping circuit configured to decrease the first load voltage and a brightness control signal from the processor according to a preset ratio, overlap the first load voltage with the brightness control signal, and output an overlapping output voltage; and
an amplifier configured to output a voltage control signal for turning on or off the load switch based on a comparison between the overlapping output voltage output from the voltage overlapping circuit and a preset reference voltage.

9. The display apparatus of claim 8, wherein the amplifier is configured to turn off the load switch based on the overlapping output voltage from the voltage overlapping circuit being greater than or equal to the preset reference voltage, and turn on the load switch based on the overlapping output voltage from the voltage overlapping circuit being smaller than the preset reference voltage.

10. The display apparatus of claim 8, wherein the processor is configured to decrease a voltage of the brightness control signal based on an increase in a brightness corresponding to the image data, and increase a voltage of the brightness control signal based on a decrease in the brightness corresponding to the image data.

11. The display apparatus of claim 8, wherein the linear regulator is further configured to, based on a display-off signal being provided from the processor, block the connection between the second rectifier and the first load capacitor.

12. The display apparatus of claim 11, wherein the linear regulator further comprises a cutoff switching circuit provided between the load switch and the amplifier, and
wherein the linear regulator is further configured to, based on the display-off signal being provided from the processor, transfer the voltage control signal from the amplifier to the load switch and turn off the load switch.

13. The display apparatus of claim 11, wherein the linear regulator is further configured to change a range of limiting the first load voltage based on the first load voltage and a brightness corresponding to the image data.

14. The display apparatus of claim 1, further comprising an audio interface configured to output sound,
wherein the first rectifier is further configured to output a second load voltage, the second load voltage corresponding to the number of turns of the first coil or half of the number of turns of the first coil, to the audio interface.

15. The display apparatus of claim 1, further comprising a third rectifier connected to a third coil of the plurality of secondary coils, the third rectifier being configured to output a third load voltage corresponding to a number of turns of the third coil or half of the number of turns of the third coil, to the processor.

16. A power supply comprising:
a transformer comprising a primary coil and a plurality of secondary coils;
a first rectifier directly connected to a first coil of the plurality of secondary coils, the first rectifier being configured to output a first output voltage corresponding to a number of turns of the first coil;
a direct current-direct current (DC-DC) converter configured to receive the first output voltage directly from the first rectifier and output a second output voltage that is different from the first output voltage; and
a second rectifier directly connected to a second coil of the plurality of secondary coils, the second rectifier being configured to output a first load voltage which is a sum of the second output voltage and a third output voltage corresponding to a number of turns of the second coil.

17. The power supply of claim 16, wherein the DC-DC converter is further configured to adjust the second output voltage based on the first load voltage.

18. The power supply of claim 16, wherein the DC-DC converter comprises:
a buck converter comprising a switch, a diode, and an inductor; and
a duty controller configured to control a duty cycle of the switch based on the first load voltage.

19. The power supply of claim 16, further comprising:
a first load capacitor configured to output the first load voltage; and
a linear regulator provided between the second rectifier and the first load capacitor, the linear regulator being configured to limit the first load voltage from the first load capacitor within a preset range.

20. The power supply of claim 19, wherein the linear regulator comprises:
a load switch provided between the second rectifier and the first load capacitor, the load switch being configured to control a connection between the second rectifier and the first load capacitor;
a voltage divider configured to decrease the first load voltage at a preset ratio and output the reduced first load voltage; and
an amplifier configured to output a voltage control signal for turning on or off the load switch based on a comparison between the reduced second load voltage from the voltage divider and a preset reference voltage.

21. A display apparatus comprising:
a memory for storing one or more instructions;
a processor configured to execute the one or more instructions to:
control a first rectifier to directly provide a first output voltage corresponding to a number of turns of a first coil of the first rectifier;
control a direct current-direct current (DC-DC) converter to directly receive the first output voltage from the first rectifier and provide a second output voltage that is different from the first output voltage; and control a second rectifier to directly provide a first load voltage, which is a sum of the second output voltage and a third output voltage, the third output voltage corresponding to a number of turns of a second coil, to a display.

22. The display apparatus of claim 21, wherein the processor is further configured to control a duty cycle of a switch based on the first load voltage.

23. The display apparatus of claim 22, wherein the processor is further configured to control the duty cycle of the switch to decrease the second output voltage according to an increase of the first load voltage, and increase the second output voltage according to a decrease of the first load voltage.

24. The display apparatus of claim 22, wherein the processor is further configured to decrease a voltage of a brightness control signal based on an increase in a brightness corresponding to image data, and increase the voltage of the brightness control signal based on a decrease in the brightness corresponding to the image data.

* * * * *